US011949944B2

(12) United States Patent
Woodruff et al.

(10) Patent No.: US 11,949,944 B2
(45) Date of Patent: Apr. 2, 2024

(54) METHODS, SYSTEMS, ARTICLES OF MANUFACTURE, AND APPARATUS TO IDENTIFY MEDIA USING SCREEN CAPTURE

(71) Applicant: The Nielsen Company (US), LLC, New York, NY (US)

(72) Inventors: Stanley Wellington Woodruff, Palm Harbor, FL (US); John T. Livoti, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/846,909

(22) Filed: Jun. 22, 2022

(65) Prior Publication Data

US 2023/0209128 A1 Jun. 29, 2023

Related U.S. Application Data

(60) Provisional application No. 63/294,759, filed on Dec. 29, 2021.

(51) Int. Cl.
*H04N 23/00* (2023.01)
*G06F 3/14* (2006.01)
*H04N 21/00* (2011.01)
*H04N 21/433* (2011.01)
*H04N 9/00* (2006.01)

(52) U.S. Cl.
CPC ....... *H04N 21/4334* (2013.01); *G06F 3/1454* (2013.01); *H04N 23/00* (2023.01)

(58) Field of Classification Search
USPC ....... 386/285, 278, 280, 286, 282, 239, 241, 386/248
See application file for complete search history.

(56) References Cited

U.S. PATENT DOCUMENTS

| 7,827,312 | B2 | 11/2010 | Ramaswamy et al. |
| 8,103,879 | B2 | 1/2012 | Levy et al. |
| 8,108,535 | B1 | 1/2012 | Roberts et al. |

(Continued)

OTHER PUBLICATIONS

United States Patent and Trademark Office, "Final Office Action," in connection with U.S. Appl. No. 15/668,538, dated Jun. 6, 2019, 12 pages.

(Continued)

*Primary Examiner* — Daquan Zhao

(57) ABSTRACT

Methods, apparatus, systems, and articles of manufacture are disclosed that utilize screen capture to identify media. Example meter devices disclosed herein are to, in response to determining a media device is powered on, monitor a media device to detect audio output by the media device. Disclosed example meter devices are also to, in response to audio not being detected for a period of time, instruct an image capture device to capture image data representative of a media presentation by the media device. Disclosed example meter devices are also to instruct the image capture device to stop capturing the image data in response to detection of audio output by the media device. Disclosed example meter devices are also to determine, based on whether the image data corresponds to a menu presentation by the media device, whether to transmit the image data to a central facility for media identification.

20 Claims, 14 Drawing Sheets

(56) References Cited

U.S. PATENT DOCUMENTS

| | | |
|---|---|---|
| 8,773,862 B1 | 7/2014 | Ullman |
| 8,842,185 B1 | 9/2014 | Spears et al. |
| 8,990,844 B2 | 3/2015 | Oh et al. |
| 9,124,853 B2 | 9/2015 | Vanderhoff et al. |
| 9,245,309 B2 | 1/2016 | Blesser |
| 9,313,544 B2 | 4/2016 | Besehanic |
| 9,357,261 B2 | 5/2016 | Besehanic |
| 10,147,433 B1 | 12/2018 | Bradley |
| 2002/0052885 A1 | 5/2002 | Levy |
| 2002/0116715 A1 | 8/2002 | Apostolopoulos |
| 2003/0121046 A1 | 6/2003 | Roy et al. |
| 2005/0081244 A1 | 4/2005 | Barrett et al. |
| 2006/0212705 A1 | 9/2006 | Thommana et al. |
| 2006/0230414 A1 | 10/2006 | Zhang |
| 2006/0239503 A1 | 10/2006 | Petrovic et al. |
| 2007/0162927 A1 | 7/2007 | Ramaswamy et al. |
| 2007/0186163 A1 | 8/2007 | Yeh et al. |
| 2008/0253586 A1 | 10/2008 | Wei |
| 2008/0256576 A1 | 10/2008 | Nesvadba et al. |
| 2010/0009713 A1 | 1/2010 | Freer |
| 2011/0157475 A1 | 6/2011 | Wright et al. |
| 2011/0243526 A1* | 10/2011 | Hiroi .................. G11B 27/28 386/E5.003 |
| 2012/0079535 A1 | 3/2012 | Kivirauma et al. |
| 2013/0205319 A1 | 8/2013 | Sinha et al. |
| 2014/0108020 A1 | 4/2014 | Sharma et al. |
| 2014/0250450 A1* | 9/2014 | Yu ...................... H04N 21/4331 725/19 |
| 2014/0304731 A1 | 10/2014 | Dhawan et al. |
| 2015/0058877 A1* | 2/2015 | Lakkundi ............ H04N 21/439 725/19 |
| 2015/0082349 A1 | 3/2015 | Ishtiaq et al. |
| 2015/0125029 A1 | 5/2015 | Li |
| 2015/0326922 A1 | 11/2015 | Givon et al. |
| 2015/0365725 A1 | 12/2015 | Belyaev et al. |
| 2016/0127759 A1 | 5/2016 | Jung et al. |
| 2016/0142647 A1 | 5/2016 | Gopinath et al. |
| 2016/0198200 A1 | 7/2016 | Choi |
| 2016/0378427 A1 | 12/2016 | Sharma et al. |
| 2017/0280098 A1 | 9/2017 | Sethuraman et al. |
| 2020/0143430 A1 | 5/2020 | Tapse |

OTHER PUBLICATIONS

United States Patent and Trademark Office, "Non-Final Office Action," in connection with U.S. Appl. No. 15/668,538, dated Feb. 8, 2019, 11 pages.

United States Patent and Trademark Office, "Final Office Action," in connection with U.S. Appl. No. 15/668,538, dated Sep. 4, 2018, 12 pages.

United States Patent and Trademark Office, "Non-Final Office Action," in connection with U.S. Appl. No. 15/668,538, dated Feb. 1, 2018, 11 pages.

United States Patent and Trademark Office, "Final Office Action," in connection with U.S. Appl. No. 16/593,711, dated Dec. 1, 2021, 13 pages.

United States Patent and Trademark Office, "Non-Final Office Action," in connection with U.S. Appl. No. 16/593,711, dated May 6, 2021, 13 pages.

United States Patent and Trademark Office, "Final Office Action," in connection with U.S. Appl. No. 16/593,711, dated Jan. 19, 2021, 12 pages.

United States Patent and Trademark Office, "Non-Final Office Action," in connection with U.S. Appl. No. 16/593,711, dated Jul. 20, 2020, 12 pages.

* cited by examiner

METHODS, SYSTEMS, ARTICLES OF MANUFACTURE, AND APPARATUS TO IDENTIFY MEDIA USING SCREEN CAPTURE

RELATED APPLICATION

This patent claims the benefit of U.S. Provisional Patent Application No. 63/294,759, which was filed on Dec. 29, 2021. U.S. Provisional Patent Application No. 63/294,759 is hereby incorporated herein by reference in its entirety. Priority to U.S. Provisional Patent Application No. 63/294,759 is hereby claimed.

FIELD OF THE DISCLOSURE

This disclosure relates generally to audience measurement and, more particularly, to methods, systems, articles of manufacture, and apparatus to identify media using screen capture.

BACKGROUND

Media monitoring companies desire knowledge on how users interact with media devices such as smartphones, tablets, laptops, smart televisions, etc. For example, media monitoring companies monitor media presentations made at the media devices to, among other things, monitor exposure to advertisements, determine advertisement effectiveness, determine user behavior, identify purchasing behavior associated with various demographics, etc.

Figure 1:
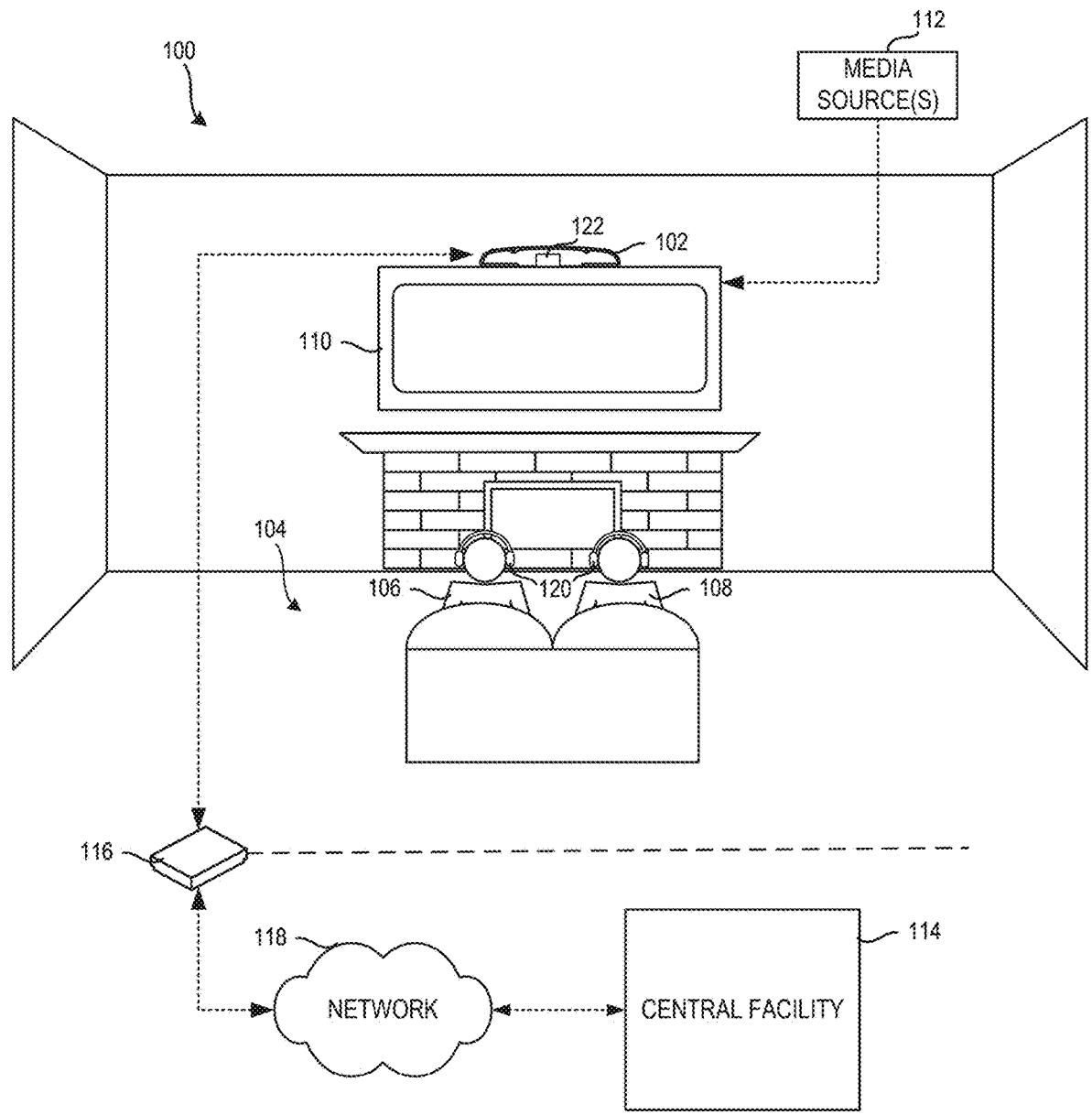
FIG. 1 illustrates an example audience measurement system having an example meter to monitor an example media presentation environment.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Traditionally, monitoring companies, such as audience measurement entities, monitor media presentations made at media devices based on registered panel members (e.g., panelists). That is, an audience measurement entity (AME) enrolls people who consent to being monitored into a panel. The AME then monitors those panel members to collect media measurement data by identifying media (e.g., television programs, radio programs, movies, DVDs, etc.) presented to those panel members. In this manner, audience viewership data is collected and used by the audience measurement entity to determine exposure statistics (e.g., viewership statistics) for different media based on the collected media measurement data. As used herein, the term "media" includes any type of content and/or advertisement delivered via any type of distribution medium. For example, media can include audio and/or visual (still or moving) content and/or advertisements such as television programming or advertisements, radio programming or advertisements, movies, web sites, streaming media, etc.

To facilitate such monitoring, AMEs often install meters at a media presentation location(s) of a panelist. The meter can monitor media presentations and transmit media monitoring information to a central facility of the AME. In some examples, the AME identifies media using audio watermarking techniques and/or signature-based techniques. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), which convey media identifying information and/or an identifier that may be mapped to media identifying information, into an audio and/or video component. For example, the AME can embed a code into the media that is inaudible to a human ear. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). The audio watermarking technique relies on audio signals received at the meter to identify media. To identify watermarked media, the watermark(s) are extracted and decoded to obtain the conveyed media identifying information and/or used to access a table of reference watermarks that are mapped to media identifying information.

Unlike audio watermarking techniques based on codes included with the monitored media, fingerprint or signature-based media monitoring techniques generally use one or more inherent characteristics of the monitored media during a monitoring time interval to generate a substantially unique proxy for the media. Signature-based media monitoring generally involves determining (e.g., generating and/or collecting) a signature(s) representative of a media signal (e.g., an audio signal and/or a video signal) output by a monitored media device and comparing the monitored signature(s) to one or more reference signatures corresponding to known (e.g., reference) media sources. Such a proxy is referred to as a signature or fingerprint, and can take any form (e.g., a series of digital values, a waveform (e.g., sound waves), etc.) representative of any aspect(s) of the media signal(s) (e.g., the audio and/or video signals forming the media presentation being monitored). A signature may be a series of signatures collected in series over a timer interval. Accordingly, the term "fingerprint" and "signature" are used interchangeably herein and are defined herein to mean a proxy for identifying media that is generated from one or more inherent characteristics of the media. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature.

However, there are instances in which audio watermarking and/or signature-based matching techniques cannot be used to identify media. For example, the meter may determine that a media device is on (e.g., based on power/current sensing and/or any other on/off detection technique) but may not sense audio and/or other signals from the media device (e.g., such as when the media device is muted and/or during other moments of silence, etc.). As disclosed herein, a moment of silence refers to a period of time (e.g., a threshold period) in which the meter identifies the media device as being powered on but does not detect audio signals output by the media device. Consequently, the audio watermarking and/or signature-based techniques may not be useful for identifying media in such moments of silence. In some examples, the moment of silence can be contributed to the panelist having a volume of the media device off, muted, or otherwise inaudible, such as when the panel member is wearing headphones while viewing the media, using subtitles, etc. In some examples, the moment of silence can be contributed to the panel member viewing or otherwise remaining on a menu screen and thus not viewing media. For example, the panel member may be on a menu screen of a streaming provider while searching for media to view.

In some examples, the AME can identify media presented to the panel member without the meter sensing audio. For example, the meter may collect data such as a presentation time and broadcast channel, which can be combined to identify the media being viewed by the panel member. In recent years, however, media devices have been provided with Internet connectivity and the ability to retrieve media from the Internet. As such, media exposure has shifted away from conventional methods of presentation, such as broadcast television, towards presentation via consumer devices accessing media via the Internet. In such examples, a signature, fingerprint, and/or other metadata may be unavailable to identify media content or a source (e.g., provider) of the media content. Accordingly, a new technique to identify media presented at the media device is needed.

AMEs are typically interested in identifying media that panel members view as well as a provider (e.g., a media provider, content provider, streaming provider, etc.) of such media. In some examples, the meter can be structured to determine a source Uniform Resource Locator (URL) of the media to identify a streaming provider (e.g., Hulu®, Amazon Prime®, etc.) as the content streams wirelessly to the media device. However, as discussed above, if the meter is unable to collect watermarks or signatures, the media displayed at the media device cannot be identified. Thus, some meters can collect data used to determine which streaming provider is presenting the media, but cannot be used to identify the media presented at the media device. In some examples, the meter collects data that can be used to identify media presented at the media device, but cannot be used to determine which streaming provider is presenting the media. For example, if the meter is communicatively coupled to a media device with a direct coax connection, the meter may be able to sense audio that can be used to determine that the panelist is viewing specific media (e.g., a football game) using an audio watermarking and/or signature-based monitoring technique. However, the meter (and/or the central facility) may be unable to determine which streaming provider the panelist is using to present the media (e.g., the football game) at the media device. Accordingly, a new meter or meter improvement is needed that can facilitate identification of media being presented at the media device and identification of a provider of the media.

Example methods, systems, articles of manufacture, and apparatus disclosed herein utilize screen capture to identify media presented at a media device and/or a provider of such media content. For example, screen capture may be utilized during a moment of silence detected by an example meter. Example meters disclosed herein are communicatively coupled to a screen capture device that is structured to capture image data corresponding to a media presentation at a media device (e.g., a display screen of the media device). For example, the screen capture device may capture image data in response to a command from the meter. As disclosed herein, to capture an image of a media device means to capture an image of a display screen of the media device. In some examples, the image capture device is an image sensor, such as a camera, that is aimed at a display screen of the media device. In some examples, the image capture device is a screen capture device communicatively connected to the meter and to a "video out" port of the media device. In some examples, the image capture device is a component of the meter. In some examples, the image capture device is separate from the meter, but communicatively coupled to the meter (e.g., via a wireless and/or wired connection). For example, the image capture device can be a dongle extender to the meter to capture screen shots of the presentation at the media device.

Example meters disclosed herein collect media identifying data (e.g., audio data, image data, presentation time, broadcast channel, etc.) used to identify media presented at the media device while the media device is powered on. In some examples, the meter collects audio data as a first process for identifying media presented at the media device. For example, the meter may record audio data to collect data such as watermarks or codes and transmit such recorded audio data to the central facility to be mapped against a library of audio to identify the media.

Example meters disclosed herein monitor for audio signals while the media device is powered on. If the meter determines that the media device is powered on but is not sensing audio, example meters disclosed herein trigger (e.g., initiate, commence, etc.) a screen capture mode. In other words, in some examples, the meter collects image data as a secondary process for identifying media presented at the media device and/or to identify a provider of the media. For example, the meter may collect image data upon a failure to collect audio data (e.g., during a moment of silence).

During the screen capture mode, the image capture device is configured to capture an image(s) (e.g., a screen shot) of the media device. For example, image capture mode may be triggered when the media device volume is off, muted, and/or otherwise inaudible, such as if the panel member is using a headset, when the panelist is on a menu screen, etc. It is understood, however, that the meter can initiate screen capture mode at any point of interest. For example, the meter can initiate screen capture mode at a presentation of a commercial in additional or alternative examples. In some examples, the meter may stop (e.g., halt, end, etc.) screen capture mode upon detection of audio signal. In some examples, the image capture device continually (e.g., repetitively) captures image data while the media device is determined to be on. For example, the screen capture device can be structured to periodically and/or aperiodically capture image data of the media presentation until the meter detects audio signals output by the media device. It is further understood that the screen capture device can capture video data of the media device in additional or alternative examples.

By capturing image data during a moment of silence, the image data can be used to determine whether media was presented at the media device during the moment of silence and, if so, to identify the media. Further, by capturing image data during the moments of silence, the image data can be used to identify a streaming provider of media presented immediately after the moment of silence. For example, the moment of silence may have been contributed to the panelist searching for and selecting media to view. When the panelist selects the media, the meter may be able to detect audio corresponding to the audio. Thus, the image data could be used to identify the provider of the media.

In some examples, the meter sends the collected data (e.g., image data, audio data, etc.) to a central facility for processing and/or identification (e.g., of media, a provider, etc.). For example, the meter sends (e.g., transmits) the image data to the central facility to be mapped against an image library to identify media. In some examples, the meter tags the image data as a moment of silence to indicate to the central facility that image recognition technology may need to be utilized to identify the media during the silence and/or to identify a provider of media identified after the moment of silence. The central facility may merge results obtained from the secondary process (e.g., image data processing) and results obtained from the first process (e.g., audio data processing) using timestamps associated with the data. Currently, the AME may be unable to report media measurement data during a period of silence, resulting in a gap in the report. Accordingly, examples disclosed herein may be utilized to fill gaps in which the meter does not sense audio.

In additional or alternative examples, an audio library, a media image library, and/or a media video library may be stored on the meter. In such examples, the meter can be structured to map the media identifying data against a corresponding library to identify media. However, the audio library, the media image library, and/or the media video library may include significant amounts of data (e.g., at least terabytes). Accordingly, examples disclosed herein store the audio library, the media image library, and/or the media video library at the central facility and transmit the media identifying data from the meter to the central facility for mapping and crediting.

Some example meters can determine whether image data collected during a moment of silence corresponds to a menu screen before transmitting the image data to the central facility. For example, the meter can store an image library of media provider identifying images (e.g., a provider image library), which can include images of streaming provider logos and/or images of streaming provider menus. The meter and/or an Edge computing attachment can integrate aspects of Edge networking by mapping an image against the provide image library to determine whether captured image data corresponds to a menu screen. For example, captured image data may be mapped against the library to determine whether the panel member is on a menu screen (e.g., as opposed to viewing media using headphones). If a match is made and the meter determines that the image data corresponds to the menu screen, the meter may send the determination instead of the image data. For example, the provider match data can be time stamped and sent to the central facility with an indication of which streaming provider menu was open during that time point in a silent period. As a panelist might browse several different streaming providers to select media to view, this may be done continuously (e.g., every 5 seconds) during a moment of silence. In some examples, the central facility can credit as usual using codes and signatures where possible, and use the streaming provide identification data provided from the meter to determine which service was streaming content where needed. If the meter is unable to determine that the image data corresponds to the menu screen, the meter sends the image data to the central facility for processing.

Some examples disclosed herein add functionality to the meter by using image capture and/or image recognition technology for media monitoring. In some examples, the added functionality may offer a new path to identify media presented in the panel member's home. For example, image data captured by the image capture device can be used to identify media presented at the media device during a moment of silence and/or to identify a streaming provider that used to present media to a panelist. In some examples, the added functionality may facilitate crediting at a sub-minute level (e.g., by the audience measurement entity). That is, the captured image data can be used to monitor commercial activity. For example, the meter can start to gather image data (e.g., video or screenshots) while a commercial is being aired, which can be utilized to ensure that all commercial content is being presented, to ensure the correct commercial is being presented, and/or to confirm results obtained by processing sensed audio. In some examples, the added functionality may help the AME audit a meter (e.g., by comparing the images collected by the meter to the codes/signatures that the meter is detects). In some such examples, the added functionality may improve an accuracy of audience measurement determined by the AME. The capture image data may be used for additional or alternative determinations, such to confirm results obtained using audio data, etc.

In some examples, artificial intelligence (e.g., machine learning) may be used to train at least one model. In some examples, the model is trained to perform image recognition (e.g., for mapping image data against an image library). In some examples, the model is trained to determine a moment of silence. In some examples, the model is trained to associate the image data with the moment of silence. For example, a model at the central facility can be trained to self-identify received image data as a menu or program similar to the way the central facility determines commercial breaks. For example, after mapping the image data against an image library, the model can determine that an image corresponds to a streaming provider menu. Further, the model can be trained to determine that a timestamp of the image data corresponds to a moment of silence that cannot be encoded and amend a credit report accordingly.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a convolution neural network model is used. In some examples, machine learning models/architectures that are suitable to use in the example approaches disclosed herein will be a black box network in which interconnections are not visible outside the model. However, other types of machine learning models could additionally or alternatively be used such as recurrent neural networks, etc.

In some examples, implementing a ML/AI system involves two phases, a learning/training phase and an inference phase. In the learning/training phase, a training algorithm is used to train a model to operate in accordance with patterns and/or associations based on, for example, training data. In some examples, the model includes internal parameters that guide how input data is transformed into output data, such as through a series of nodes and connections within the model to transform input data into output data. In some examples, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using a training algorithm. Training is performed using hyperparameters that control how the learning is performed (e.g., a learning rate, a number of layers to be used in the machine learning model, etc.). In some examples re-training may be performed. Training is performed using training data. In examples disclosed herein, the training data originates from locally generated data. Because supervised training is used, the training data is labeled.

Once training is complete, the model is deployed for use as an executable construct that processes an input and provides an output based on the network of nodes and connections defined in the model. The model is stored at a meter and/or a central facility. The model may then be executed by the meter and/or a central facility.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is an illustration of an example audience measurement system 100 including an example media device meter (e.g., meter) 102 to monitor an example media presentation environment 104. In the illustrated example of FIG. 1, the media presentation environment 104 includes panelists 106, 108, an example media presentation device (e.g., media device) 110 that receives media from an example media source 112, and the example meter 102. The meter 102 identifies the media presented at the media device 110 and reports media monitoring information to an example central facility 114 of an audience measurement entity via an example gateway 116 and an example network 118. The example meter 102 of FIG. 1 sends media monitoring data to the central facility 114 periodically, a-periodically and/or upon request by the central facility 114.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video, and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives and/or retrieves media from the media source 112 for presentation. In some examples, the media device 110 is capable of directly presenting media (e.g., via a display) while, in other examples, the media device presents the media on separate media presentation equipment (e.g., speakers, a display, etc.). Thus, as used herein "media devices" may or may not be able to present media without assistance from a second device. Media devices are typically consumer electronics. While in the illustrated example, a television is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

The example meter 102 detects exposure to media and electronically stores monitoring information including media identifying data (e.g., a code/watermark detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The central facility 114 of the illustrated example is implemented by one or more servers. The central facility 114 processes and stores data received from the meter 102. In some examples, the central facility 114 is associated with an audience measurement entity. In some examples, the central facility 114 can be a physical processing center (e.g., a central facility of the audience measurement entity, etc.). Additionally or alternatively, the central facility 114 can be implemented via a cloud service (e.g., AWS®, etc.). In this example, the central facility 114 can further store and process generated watermark and signature reference data and image data.

In some examples, the example gateway 116 hosts a Local Area Network (LAN) for the media presentation environment 104. In the illustrated example, the LAN is a wireless local area network (WLAN), and allows the meter 102, the media device 110, image capture device 122, etc. to transmit and/or receive data via the Internet. Alternatively, the gateway 116 may be coupled to such a LAN. In some such examples, the meter 102 may communicate with the central facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The meter 102 of the illustrated example of FIG. 1 is structured to monitor media presented by the media device 110 upon a determination that the media device 110 and/or other media presentation device(s) is powered on. In some examples, the meter 102 employs audio watermarking techniques and/or signature based-metering techniques. For example, the meter 102 of the illustrated example senses audio (e.g., acoustic signals or ambient audio) output (e.g., emitted) by the media device 110. The meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an audio sensor (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

In some examples, the meter 102 is positioned in a location such that the audio sensor (e.g., microphone) receives ambient audio produced by the television and/or other devices of the media presentation environment 104 with sufficient quality to identify media presented by the media device 110 and/or other devices of the media presentation environment 104 (e.g., a surround sound speaker system). For example, in examples disclosed herein, the meter 102 may be placed on top of the television, secured to the bottom of the television, etc.

To generate exposure data for the media, identification(s) of media to which the audience is exposed are correlated with people data (e.g., presence information) collected by a meter (e.g., meter 102). For example, the meter 102 can collect inputs (e.g., audience monitoring data) representative of the identities of the audience member(s) (e.g., the panelists 106, 108). In some examples, the meter 102 collects audience monitoring data by periodically or a-periodically prompting audience members in the monitored media presentation environment 104 to identify themselves as present in the audience (e.g., audience identification information). In some examples, the meter 102 responds to events (e.g., when the media device 110 is turned on, a channel is changed, an infrared control signal is detected, etc.) by prompting the audience member(s) to self-identify. In some examples, another meter may be used to collect people data (e.g., user identifiers, demographic data associated with audience members, etc.). The media identifying information and people data (e.g., collected by a people meter) can be combined to generate, for example, media exposure data (e.g., ratings data) indicative of amount(s) and/or type(s) of people that were exposed to specific piece(s) of media distributed via the media device 110. Any other type(s) and/or number of media monitoring techniques can be supported by the meter 102.

To extract media identification data, the meter 102 and/or the example central facility 114 (e.g., corresponding to the AME) extracts and/or processes the collected media identifying information and/or data received by the meter 102, which can be compared to reference data to perform source and/or content identification. For example, the meter 102 may process the audio and send the audio data to the central facility 114. At the central facility 114, the audio data is searched against a database (e.g., mapped) to identify the media. For example, the audio data may be a code that is embedded into the media and/or a signature such as a sound wave of the media. Using the audio data, the media being presented at the media device 110 can be determined.

In some instances, the meter 102 may determine that the media device 110 is on, but does not sense audio. For example, the panelist 106, 108 may be using example headphones 120 (e.g., wired headphones and/or headphones coupled to the media device via a Bluetooth® connection) while viewing the media, the panelist may be on a menu screen, the panelist may have a volume of the media device 110 on mute, etc. In such instances, the meter 102 may not be able to sense audio that can be used to identify the media. Accordingly, the meter 102 of FIG. 1 is communicatively coupled to an example image capture device 122. The image capture device 122 can collect image data that may be utilized to identify the media.

The example image capture device 122 of FIG. 1 is structured to capture an image(s) of the media presented by the media device 110. In some examples, the image capture device 122 captures images in moments of silence. For example, the image capture device 122 begins to capture images when the media device 110 is on, but the meter 102 does not receive an audio signal. In some examples, the image capture device 122 captures images at a commercial presentation. In additional or alternative examples, the image capture device 122 may be structured to capture images at other points in time, such as continuously, periodically (e.g., every 2 second, etc.), a-periodically and/or based on any other trigger.

In the illustrated example of FIG. 1, the image capture device 122 is a camera added to the meter 102. For example, the image capture device 122 of FIG. 1 is a camera dongle extender that is aimed at the media device 110 and sticks out just far enough from the meter 102 to capture a display screen of the media device 110. In some examples, the image capture device 122 can include a lens designed to compensate for an angle it is capturing the image from (e.g., close to top and far from a bottom of the media device 110). In some examples, image correction can be done at the meter 102 and/or the central facility 114 (e.g., via software). As such, the image capture device 122 would not have a field of view that would violate a panelist's privacy because the image capture device 122 has a field of view focused on the media device 110. Additionally or alternatively, the image capture device 122 is a screen capture device that is communicatively coupled to the meter 102 and to a video out port of the media device 110. In such examples, the image data captured by the image capture device 122 corresponds to screen shots of the media device 110.

Figure 2:
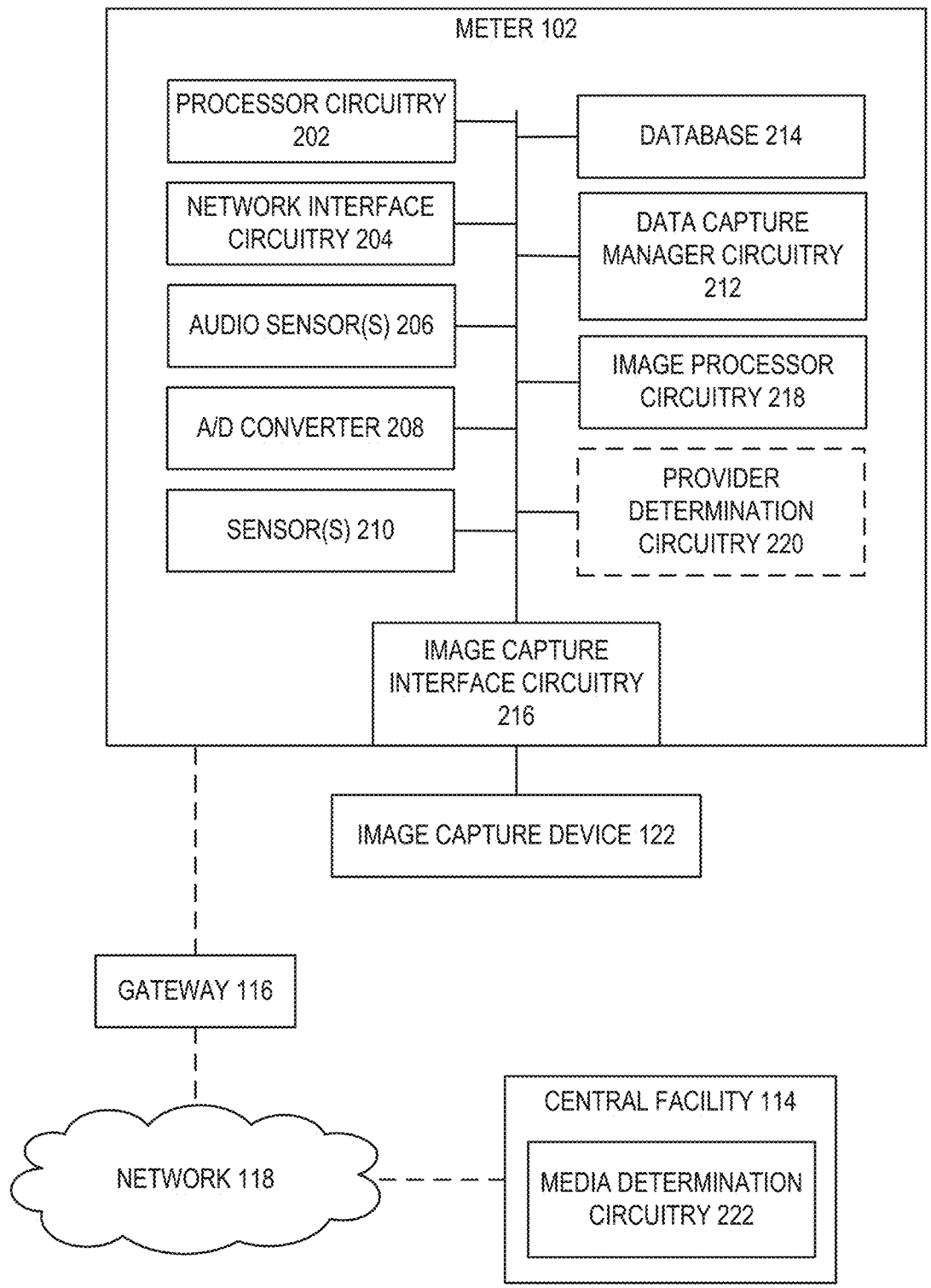
FIG. 2 is a block diagram of the audience measurement system of FIG. 1, including an example image capture device communicatively coupled to an example meter in accordance with the teachings of this disclosure.

FIG. 2 is a block diagram of the example audience measurement system 100 of FIG. 1, including the example meter 102 structured to monitor media presentations at an example media device (e.g., media device 110). The meter 102 of FIG. 2 may be instantiated (e.g., creating an instance of, bring into being for any length of time, materialize, implement, etc.) by processor circuitry such as a central processing unit executing instructions. Additionally or alternatively, the meter 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example meter 102 is communicatively coupled to the example central facility 114 via the example network 118. In the illustrated example of FIG. 2, the example meter 102 is communicatively coupled to the example image capture device of FIG. 1. The image capture device 122 is structured to capture images (e.g., video and/or still frames) of media presented at a media device (e.g., media device 110).

The meter 102 includes example processor circuitry 202, which executes machine readable instructions (e.g., software). The processor circuitry 202 of FIG. 2 is a semiconductor-based hardware logic device. For example, the processor circuitry 202 can be implemented by one or more integrated circuits, logic circuits, microprocessors, or controllers from any desired family or manufacturer. In some examples, the processor circuitry 202 is communicatively coupled to additional processor circuitry.

The meter 102 includes example network interface circuitry 204, which is a communication interface configured to send or otherwise transmit communications from the meter 102 to the central facility 114. In the illustrated example of FIG. 2, the network interface circuitry 204 is also configured to receive communications at the meter 102 from the central facility 114. In the illustrated example, the network interface circuitry 204 facilitates wired communication via an Ethernet network hosted by the example gateway 116 of FIG. 1. In some examples, the network interface circuitry 204 is implemented by a Wi-Fi radio that communicates via the LAN hosted by the example gateway 116. In other examples disclosed herein, any other type of wireless transceiver may additionally or alternatively be used to implement the network interface circuitry 204. In examples disclosed herein, the network interface circuitry 204 may receive ambient audio data from the example meter 102.

The meter 102 includes an example audio sensor 206, which is structured to detect audio signals output by the media device 110. For example, the meter 102 receives and processes the signals output by the media device 110 to detect media and/or source identifying signals (e.g., audio watermarks) embedded in portion(s) (e.g., audio portions) of the media presented by the media device 110. The example audio sensor 206 of the illustrated example of FIG. 2 is a microphone. The example audio sensor 206 receives ambient sound (e.g., free field audio) including audible media in the vicinity of the meter 102. Additionally or alternatively, the example audio sensor 206 may be implemented by a line input connection. The line input connection may allow an external microphone to be used with the meter 102 and/or, in some examples, may enable the audio sensor 206 to be directly connected to an output of a media device 110 (e.g., an auxiliary output of a television, an auxiliary output of an audio/video receiver of a home entertainment system, etc.).

The meter 102 of FIG. 2 includes an example A/D converter 208, which is structured to convert an analog signal into a digital signal. For example, the audio sensor 206 may receive an analog audio signal from the media device 110 and transmit the analog signal to the A/D converter 208. The example A/D converter 208 can obtain the audio data recorded by the audio sensor 206 and convert the audio data into digital audio data. The meter 102 can transmit the digital audio data to the central facility 114 for identification of media.

In the illustrated example of FIG. 2, the meter 102 includes at least one additional example sensor(s) 210. For example, the sensor 210 may be a sensor to detect whether the media device 110 is on. In some examples, the meter 102 determines whether the media device 110 or other monitored information presenting device (e.g., a computer monitor, etc.) is operating in an ON (active) state or an OFF (inactive) state. Such ON/OFF detection information concerning the operating state of the media device 110 may be used to determine whether the media device 110 is turned ON and emitting audio signals consistent with operation in an active state. To facilitate the determination of the operating state of the media device 110 or corresponding information presenting device, the meter 102 may be provided with one or more sensors 210. For example, a sensor 210 may be implemented by a microphone placed in the proximity of the media device 110 to receive audio signals corresponding to the program being displayed. The meter 102 may then process the audio signals received from the microphone 120 to decode any embedded ancillary code(s) and/or generate one or more audio signatures corresponding to a program being displayed.

Additionally or alternatively, a sensor 210 may be implemented by an on-screen display detector for capturing images displayed on the media device 120 and processing regions of interest in the displayed image. For example, the meter 102 can include the image capture device 122, which is structure to capture image data. The regions of interest may correspond, for example, to a broadcast channel associated with the currently displayed program, a broadcast time associated with the currently displayed program, a viewing time associated with the currently displayed program, etc.

Additionally or alternatively, a sensor 210 could be implemented by a frequency detector to determine, for example, the channel to which the media device 110 is tuned. Additionally or alternatively, a sensor 210 could be implemented by an electromagnetic (EM) field pickup, a current sensor and/or a temperature sensor configured to detect emissions from the media device 110 indicative of the media device 110 being turned ON. Persons having ordinary skill in the art will recognize that there are a variety of sensors 210 that may be coupled with the meter 102 to facilitate generation of viewing records and display device operating state data containing sufficient information to determine a set of desired ratings and/or metering results. Persons of ordinary skill in the art will also appreciate that any or all of the sensors 210 may be located separate from and/or disposed in the meter 102.

Upon detection that the media device 110 is on, the meter 102 determines whether the audio sensor 206 is detecting or otherwise recording audio signals. If the meter 102 detects the audio signals, the meter 102 records, processes, and transmits the sensed audio to the central facility 114 to be mapped against a database of audio to identify the media.

However, there are instances such as those described above in which the meter 102 determines that the media device 110 is on, but audio is not being sensed at the audio sensor 206 (e.g., a moment of silence). The meter 102 is structured to initiate image capture mode in such a moment of silence. Accordingly, the meter 102 includes example data capture manager circuitry 212, which is structured to identify the moment of silence and initiate and/or end an image capture mode. In some examples, the data capture manager circuitry 212 is implemented via executable instructions executed by on one or more processors of the meter 102. For example, the data capture manager circuitry 212 may be implemented by the processor circuitry 202 and/or other processors and/or hardware components of the meter 102.

The data capture manager circuitry 212 monitors the sensor 210 to determine whether the media device 110 is powered on. In response to determining that the media device 110 is powered on, the data capture manager circuitry 212 monitors the audio sensor 206 to determine whether the audio sensor 206 is detecting audio. In some examples, the data capture manager circuitry 212 identifies a moment of silence upon a determination that the audio sensor 206 has not recorded (e.g., valid) audio data for a threshold of time. For example, the audio sensor 206 records audio data that satisfies an audio level threshold, includes valid audio watermarks, etc. The data capture manager circuitry 212 may identify a moment of silence after a period of time in which no valid audio conditions have been detected (e.g., corresponding to silence, audio data that does not satisfy an audio level threshold or is otherwise unknown, no watermarks detected, etc.). In some examples, if the data capture manager circuitry 212 determines that the audio sensor 206 does not detect audio for the threshold period of time (e.g., 5 seconds), the data capture manager circuitry 212 initiates the image capture mode.

In some examples, data capture manager circuitry 212 may engage image capture mode at additional or alternative triggers. For example, the data capture manager circuitry 212 may engage image capture mode at a commercial break, continually while the media device 110 is on, etc. At least one blank frame is commonly used in the United States to separate commercial advertisements from other program material and during the blank frame there is generally silent audio. Thus, in some examples, a commercial break can be identified if audio signatures are detected between blank frames, and/or more particularly, if such blank frames occur at 30 second intervals or less or multiples of 30-second intervals indicating that the unidentified signatures probably are part of a commercial message. Example rules for determining when to engage image capture mode may be stored in an example database 214 of the meter 102.

The example database 214 of the illustrated example is implemented by any memory, storage device and/or storage disc for storing data such as, for example, flash memory, magnetic media, optical media, solid state memory, hard drive(s), thumb drive(s), etc. Furthermore, the data stored in the database 214 may be in any data format such as, for example, binary data, comma delimited data, tab delimited data, structured query language (SQL) structures, etc. While, in the illustrated example, the database 214 is illustrated as a single device, the database 214 and/or any other data storage devices described herein may be implemented by any number and/or type(s) of memories.

The data capture manager circuitry 212 is structured to instruct (e.g., command) the example image capture device 122 to capture an image(s) of the media device 110 during the image capture mode. For example, the data capture manager circuitry 212 can provide instructions to the image capture device 122 via example image capture interface circuitry 216. The example image capture interface circuitry 216 is structured to interface between the meter 102 and the image capture device 122. In some examples, the image capture interface circuitry 216 implements an image capture device driver.

Upon instruction from the data capture manager circuitry 212, the image capture device 122 is structured to capture images corresponding to a display screen of the media device 110. The image capture device 122 can capture a single frame and/or a series of frames (e.g., a video). In some examples, the image capture device 122 captures a series of frames (e.g., a video). For example, the image capture device 122 may capture images continuously until the image capture device 122 is instructed to stop capturing images. For example, the image capture device 122 captures may capture a single frame at certain intervals, such as every N seconds. For example, a commercial may be as short as 3 seconds in duration. Accordingly, the image capture device 122 may be structured to capture a single frame every 2-3 seconds in some examples. The image capture device 122 can capture images at any suitable frame rate, such as 60 frames per second. In the example of FIG. 2, the image capture device 122 captures image frames at a rate of one frame per two seconds.

In the illustrated example of FIG. 2, the image capture device 122 continues to capture images (e.g., at the frame rate) until instructed otherwise. For example, the data capture manager circuitry 212 may initiate image capture mode upon detection of the moment of silence. The data capture manager circuitry 212 determines to end image capture mode when the audio sensor 206 begins to detect audio signals output by the media device 110. In some examples, the data capture manager circuitry 212 can end image capture mode by instructing the image capture device 122 to cease capturing image data via the image capture interface circuitry 216. However, the image capture device 122 may be configured to capture images continuously, and/or based on another trigger. For example, the image capture device 122 can be configured to continuously capture image data (e.g., a single frame every 2 seconds). In some such examples, the image data can be used to verify media identifications based on audio data captured by the meter 102, determine the source (e.g., provider) of the media identified based on the audio data captured by the meter 102, etc.

In some examples, the data capture manager circuitry 212 is structured to instruct the image capture device 122 to begin capturing images at the beginning of a moment of silence and to instruct the image capture device to stop capturing images when the audio sensor 206 senses audio and/or when the meter determines the media device 110 is off. In some examples, the data capture manager circuitry 212 is structured to instruct the image capture device 122 to begin capturing images at a beginning of a commercial presentation and to instruct the image capture device 122 to stop capturing images at an end of the commercial presentation. In some such examples, the image data during the commercial presentation can be used to confirm that a commercial was presented. In some examples, the data capture manager circuitry 212 is structured to instruct the image capture device 122 to capture commercial image data at a different frame rate than during a moment of silence. For example, the data capture manager circuitry 212 may be structured to instruct the image capture device 122 to capture images of a commercial presentation at a rate or two image frames per second (e.g., as opposed to a rate of one frame per 2 seconds for a moment of silence). In some such examples, the first image of the commercial presentation can be used to identify the commercial and the second image of the commercial presentation can be used to verify the identification of the commercial.

In the illustrated example of FIG. 2, the image capture device 122 is an image sensor, such as a camera. The image capture device 122 may be structured to capture video and/or still images (e.g., screen shots) of the media presented at the media device 110. The image capture device 122 is positioned such that the image capture device 122 can capture image data corresponding to the presentation of media without capturing image data of an example media presentation environment (e.g., media presentation environment 104). Accordingly, the image capture device 122 is of FIG. 2 is positioned on a top of the media device 110 and angled towards the media device 110. That is, the image capture device 122 of FIG. 2 is a dongle attached to the meter 102 and angled downwards toward the media device 110. In some examples, the image capture device 122 may be positioned in another location that enables the image capture device 122 to capture images of the media presented by the media device 110.

In the illustrated example of FIG. 2, the image capture device 122 is located on top of the media device 110 and at an angle. As such, the images captured by the image capture device 122 likely need to be corrected before the image data is mapped to an image library for identification. In some examples, the image is corrected at the meter 102 (e.g., via software). In some examples, the image is corrected at the central facility 114.

The meter 102 is structured to receive image data captured by the image capture device 122 via example image capture interface circuitry 216. In the illustrated example of FIG. 2, the example image capture interface circuitry 216 receives image data from the image capture device 122 and inputs the image data into example image processor circuitry 218.

The example image processor circuitry 218 is structured to perform at least one operation on the image data. For example the image processor circuitry 218 may correct the image data that was captured at an angle. In some examples, the image processor circuitry 218 encodes image data prior to the meter 102 transmitting the image data to the central facility 114. In some examples, the image processor circuitry 218 performs additional or alternative operations on the image data prior to the meter 102 transmitting the image data to the central facility 114. For example, the image processor circuitry 218 may identify blocks (e.g., pixels) of a frame of the image data. The image processor circuitry 218 may select a subset of the blocks of the frame, stitch the subset of blocks together, and send the reduced image data to the central facility 114. The central facility 114 may perform pixelation identification within the blocks of the reduced image data. In some examples, the image processor circuitry 218 cut a frame into a plurality of pieces, and send a subset of the plurality of pieces to the central facility. For example, the subset of the plurality of pieces may include pieces of the frame that hold pertinent information corresponding to identification of media and/or a provider of media.

In the illustrated example of FIG. 2, the meter 102 is structured to determine whether an image frame corresponds to a menu screen (e.g., a main menu, a menu of a streaming provider, etc.). That is, the meter 102 of FIG. 2 is structured apply an image recognition technique to image data prior to sending the image data to the central facility 114 to determine whether the image data needs to be transferred to the central facility 114. If the image frame corresponds to a menu screen, the meter 102 may transmit a time-stamped indication of the menu screen corresponding to an image frame with a timestamp to the central facility 114 rather than the image data. In some examples, this is done to increase an efficiency of the crediting process and/or to limit an amount of data transferred from the meter 102 to the central facility 114. If the meter 102 does not determine that the image data corresponds to a menu screen, the meter 102 sends the image data to the central facility 114 for further processing and identification. Accordingly, the image processing circuitry 126 inputs the processed image data into example provider determination circuitry 220.

The example provider determination circuitry 220 is structured to map the image data to a database of streaming provider logos and/or screen shots of streaming provider menu screens. In some examples, the provider determination circuitry 220 may recognize more than one streaming provider logo. For example, the image data may correspond to a moment in which the panel member is on a main menu. In such examples, the meter 102 sends an indication that the panel member was on a main menu screen to the central facility 114 (e.g., without sending the image data to the central facility 114) at the moment. In some examples, the provider determination circuitry 220 recognizes one streaming provider logo. In such examples, the panel member was likely on a menu screen of the corresponding streaming provider. In such examples, the meter 102 can send an indication that the panel member was on the streaming provider's menu screen at that moment to the central facility 114 rather than sending the image data. In some examples, the provider determination circuitry 220 may not recognize a streaming provider. In such examples, the meter 102 transmits the image data to the central facility 114.

The central facility 114 is structured to receive collected data (e.g., audio data and/or image data) from the meter 102 and to process such data. In examples disclosed herein, the central facility 114 includes example media determination circuitry 222. In some examples, the central facility 114 is an execution environment used to implement the example media determination circuitry 222. The example media determination circuitry 222 is structured to identify media based on data transmitted by the meter 102. For example, the media determination circuitry 222 may map audio data against an audio library to identify the media. In some examples, the media determination circuitry 222 applies image recognition techniques to image data to identify media corresponding to the image data. For example, the media determination circuitry 222 may compare the image data to an image and/or video library to identify media corresponding to the image data. In some examples, the media determination circuitry 222 merges identifications for the audio data and the image data.

In some examples, the meter 102 includes means initiating image capture mode. For example, the means initiating image capture mode may be implemented by data capture manager circuitry 212. In some examples, the data capture manager circuitry 212 may be instantiated by processor circuitry such as the example processor circuitry 1112 of FIG. 11. For instance, the data capture manager circuitry 212 may be instantiated by the example general purpose processor circuitry 1200 of FIG. 12 executing machine executable instructions such as that implemented by at least blocks 802-806, 810 814-822 of FIGS. 8-9. In some examples, the data capture manager circuitry 212 may be instantiated by hardware logic circuitry, which may be implemented by an ASIC or the FPGA circuitry 1300 of FIG. 13 structured to perform operations corresponding to the machine readable instructions. Additionally or alternatively, the data capture manager circuitry 212 may be instantiated by any other combination of hardware, software, and/or firmware. For example, the data capture manager circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the meter 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example processor circuitry 202, example network interface circuitry 204, example data capture manager circuitry 212, example image capture interface circuitry 216, example image processor circuitry 218, example provider determination circuitry 220, and/or, more generally, the example meter 102 of FIG. 1, may be implemented by hardware alone or by hardware in combination with software and/or firmware. Thus, for example, any of the example processor circuitry 202, example network interface circuitry 204, example data capture manager circuitry 212, example image capture interface circuitry 216, example image processor circuitry 218, example provider determination circuitry 220, and/or, more generally, the example meter 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example meter 102 of FIG. 1 may include one or more elements, processes, and/or devices in addition to, or instead of, those illustrated in FIG. 2, and/or may include more than one of any or all of the illustrated elements, processes and devices.

Figure 3:
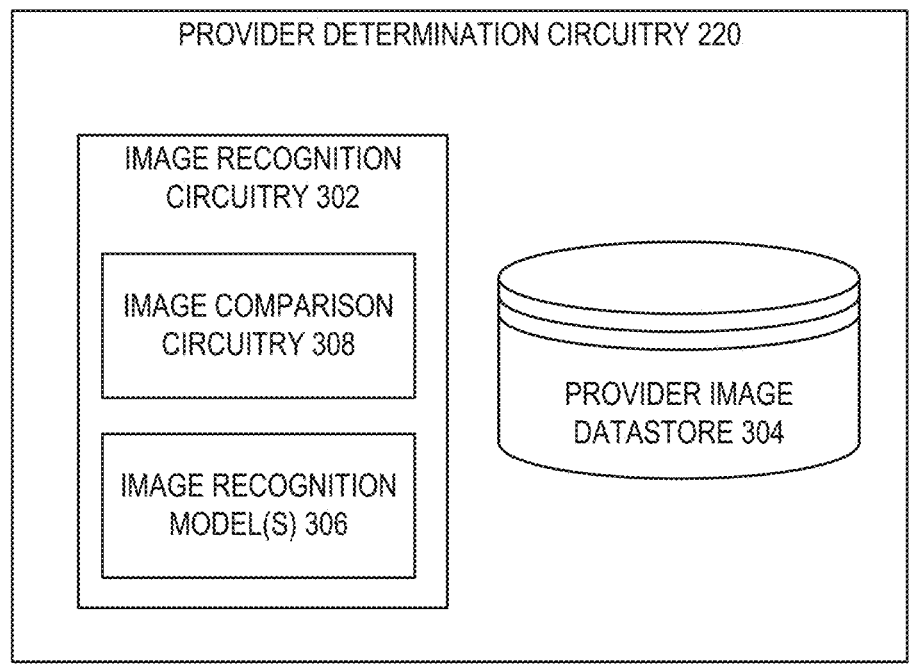
FIG. 3 is a block diagram of example provider determination circuitry of the example meter of FIG. 2 structured in accordance with the teachings of this disclosure.

FIG. 3 is a block diagram of the example provider determination circuitry 220 of FIG. 2, which is structured to determine whether an image corresponds to a streaming provider and/or a menu screen. The provider determination circuitry 220 of FIG. 3 may be instantiated (e.g., creating an instance of, bring into being for any length of time, materialize, implement, etc.) by processor circuitry such as a central processing unit executing instructions. Additionally or alternatively, provider determination circuitry 220 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the provider determination circuitry 220 is located in an example meter (e.g., meter 102 of FIGS. 1 and 2). In additional or alternative examples, the provider determination circuitry 220 may be located at a server of the central facility 114 and/or another location accessible by the meter 102 and the central facility 114.

The provider determination circuitry 220 includes example image recognition circuitry 302, which is structured to receive and/or retrieve image data captured by the image capture device 122. In some examples, the image data has been processed by the example image processor circuitry 218 of FIG. 2. For example, the provider determination circuitry 220 may receive image data from the image processor circuitry 218 after the image data has been processed (e.g., corrected).

The provider determination circuitry 220 includes an example provider image datastore 304. The provider image datastore 304 includes images corresponding to a plurality of streaming providers. For example, the provider image datastore 304 may include images of streaming provider logos, streaming provider menu screen shots, images of main menus, etc. In some examples, the provider image datastore 304 includes images of main menus from a plurality of streaming devices (e.g., a Roku®, an Apple TV®, etc.) a gaming console, a smart TV, etc.

The provider determination circuitry 220 includes example image recognition circuitry 302, which is structured to apply image recognition techniques to input an image to determine whether the image data corresponds to a streaming provider. Generally, image recognition techniques focus on contents inside an image. For example, the image recognition circuitry 302 may map the image data against the provider image datastore 304. The image recognition circuitry 302 includes an example image recognition model(s) 306, which is a pre-trained AI model. In the example of FIG. 3, the image recognition circuitry 302 applies the image recognition model 308 to a received image.

The image recognition model 308 is trained to take an input image and output previously classified labels that defines at least a portion of the image. In the example of FIG. 3, the image recognition model 308 is trained as a convolution neural network (CNN) model. However, the image recognition model 308 can be trained using other architectures in additional or alternative examples, such as a region-based CNN (e.g., R-CNN), a faster R-CNN, etc. The image recognition model 308 is structured recognize and label provider logos. For example, the image recognition model 308 can receive an image as an input and output the image including labeled bounding boxes corresponding to recognized image provider logos. The image recognition model 308 can recognition zero providers in an image, one provider logo in the image, or more than one provider logo in the image. In some examples, if the image recognition model 308 identifies zero provider logos in the image, the meter 102 transmits the image to the central facility 114 for further processing. In some examples, if the image recognition model 308 identifies one provider logo in the image, the meter 102 transmits an indication of the streaming provider corresponding to the identified streaming provider logo for the timestamped period. In some examples, if the image recognition model 308 recognizes more than one streaming provider logo, the image recognition circuitry 302 inputs the image into example image comparison circuitry 308.

The image comparison circuitry 308 is structured to compare (e.g. map) an image to images in the image datastore 304. For example, if the image recognition model 308 identifies more than one provider logo, the image comparison circuitry 308 compares the image to streaming device main menu screens in the provider image datastore 304 to determine whether the image corresponds to a main menu of a streaming device. In some examples, if the image comparison circuitry 308 does not identify a match between the image and an image in the provider image datastore 304, the meter 102 transmits the image to the central facility 114 for further processing. In some examples, if the image comparison circuitry 308 identifies the match between the image and an image in the provider image datastore 304, the meter 102 transmits an indication of the of streaming devices main menu corresponding to the identified streaming device's main menu for the timestamped period.

Figure 4:
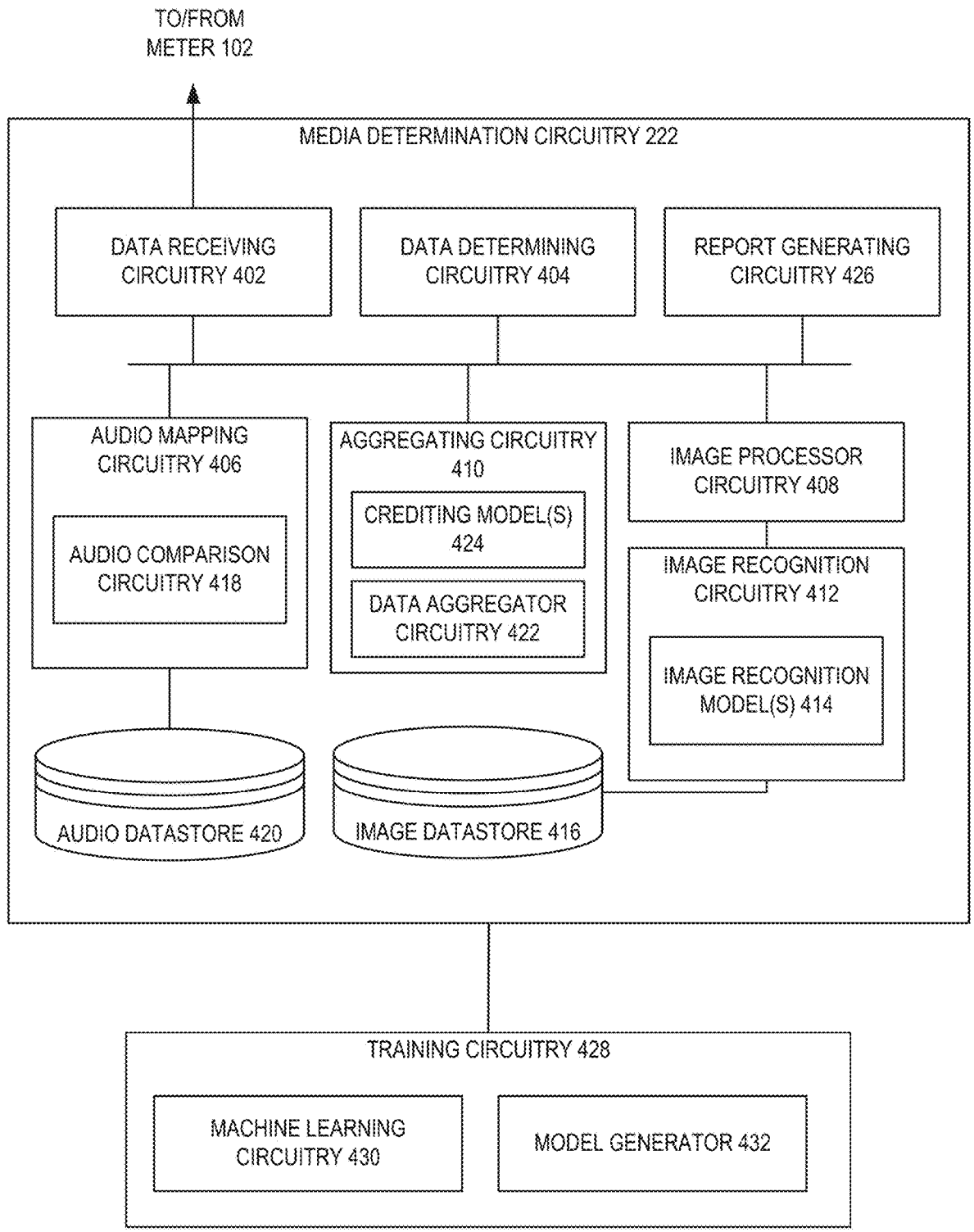
FIG. 4 is a block diagram of example media determination circuitry of the central facility of FIG. 2 structured in accordance with the teachings of this disclosure.

FIG. 4 is a block diagram of media determination circuitry 222 structured to identify media presented at an example media device (e.g., media device 110) based on data corresponding to the media presented at the media device 110 received from an example meter (e.g., meter 102). The media determination circuitry 222 of FIG. 4 may be instantiated (e.g., creating an instance of, bring into being for any length of time, materialize, implement, etc.) by processor circuitry such as a central processing unit executing instructions. Additionally or alternatively, the media determination circuitry 222 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

The media determination circuitry 222 includes example data receiving circuitry 402, which is structured to receive and/or retrieve media identifying data (e.g., audio data, image (still or moving) data, timestamps, etc.) captured and transmitted by the meter 102. In some examples, the image data has been processed (e.g., corrected to fix an angle, reduced, encoded, etc.) at the meter 102 (e.g., using example image processor circuitry 218 of FIG. 2). In some examples, the audio data has been converted to digital audio data at the meter 102. In some examples, the data includes timestamps that allow the media determination circuitry 422 to piece together the data to identify the media and a provider of the media.

The media determination circuitry 222 includes example data determining circuitry 404, which is structured to identify whether data received at the data receiving circuitry 402 is audio data or video data. For example, the data determining circuitry 404 may determine a type of data based on a header of a corresponding data packet and/or based on contents of the data packet. If the data is audio data, the data determining circuitry 404 transmits the data to example audio mapping circuitry 406. If the data is image data, the data determining circuitry 404 transmits the data to example image processor circuitry 408. If the data is neither audio data nor image data, the data determining circuitry 404 transmits the data to example aggregating circuitry 410.

The example image processor circuitry 408 structured to process image data received by the data determination circuitry 404. In some examples, the image processor circuitry 408 decodes an encoded image. In some examples, the image processor circuitry 408 processes an image to correct an image that was taken at an angle. For example, if the meter 102 has not corrected the image data (e.g., via image processor circuitry 218), the image processor circuitry 408 of the media determination circuitry 222 can correct the image. In some examples, the image processor circuitry 218 performs additional or alternative image processing, such as image cropping, image enhancement, etc. After processing the image, the image processor circuitry 408 transmits the processed image to example image recognition circuitry 412.

The media determination circuitry 222 includes example image recognition circuitry 412, which is structured to identify the media captured by the image data. In some examples, the image recognition circuitry 412 implements an image recognition engine. The image recognition circuitry 412 includes an example image recognition model(s) 414. In some examples, the image recognition circuitry 412 receives the processed image and applies the image recognition model 414 to the processed image.

The media determination circuitry 222 includes an example image datastore 416. The image datastore 416 includes images (e.g., images, video, etc.) corresponding to media. For example, the images in the image datastore 416 may be images of media such as television programs, movies, commercials, introductions, etc.

The media determination circuitry 222 includes example audio mapping circuitry 406, which is structured to identify the media captured by the audio data. The audio mapping circuitry 406 includes example audio comparison circuitry 418. In some examples, the audio mapping circuitry 406 receives the audio data and processes the audio data. The audio comparison circuitry 418 applies a recognition algorithm to the processed data. For example, the audio comparison circuitry 418 searches the audio data against a library of audio data to identify media corresponding to the audio data. Accordingly, the audio mapping circuitry 406 is communicatively coupled to an example audio datastore 420, which stores audio data.

The example image datastore 416 and/or the example audio datastore 420 of FIG. 3 is implemented by any memory, storage device and/or storage disc for storing data such as, for example, flash memory, magnetic media, optical media, solid state memory, hard drive(s), thumb drive(s), etc. Furthermore, the data stored in the image datastore 416 and/or the audio datastore 420 may be in any data format such as, for example, binary data, comma delimited data, tab delimited data, structured query language (SQL) structures, etc. While, in the illustrated example, the image datastore 416 and/or the audio datastore 420 is illustrated as a single device, the image datastore 416 and/or the audio datastore 420 and/or any other data storage devices described herein may be implemented by any number and/or type(s) of memories.

The example aggregating circuitry 410 is structured to aggregate media monitoring information received from the meter 102. The aggregating circuitry 410 receives data from the data determining circuitry 404, the image recognition circuitry 412, and the audio mapping circuitry 406. The aggregating circuitry 410 includes example data aggregator circuitry 422 and an example crediting model (2) 424.

The example data aggregator circuitry 422 receives the data corresponding to a media presentation at a media device 110 of a panelist from the data determining circuitry 404, the image recognition circuitry 412, and the audio mapping circuitry 406. Based on time-stamps associated with the data, the data aggregator circuitry 422 organizes the data.

For example, presented media identified by the audio mapping circuitry 406 and the image recognition circuitry 412 can be timely ordered to identify gaps in the media presentation. In some examples, the data aggregator circuitry 422 can thus identify moments of silence.

In some examples, the data aggregator circuitry 422 orders data obtained from the audio mapping circuitry 406 as a first process. In some such examples, the data aggregator circuitry 422 fills in gaps in the audio mapping circuitry 406 results. For example, the data aggregator circuitry 422 may be able to identify specific media presented to a panelist at the media device based on results from the audio mapping circuitry 406, but unable to identify a provider of the specific media. If the image recognition circuitry 412 was able to identify the provider of the specific media, the data aggregator circuitry 422 can tag the specific media with the provider obtained from the image recognition circuitry 412. Accordingly, the data aggregator circuitry 422 merges the results from the audio mapping circuitry 406 and the image recognition circuitry 412.

In some examples, the crediting model 424 can be applied to the results obtained from the audio mapping circuitry 406 and the image recognition circuitry 412 to identify all other tuning. All-other-tuning as disclosed herein refers to content that is not a movie and/or a television program. For example, all-other-tuning may include an introduction to a movie and/or a television program, a commercial, a menu, etc. At the central facility 114, all-other tuning may be split into such categories. Accordingly, the crediting model 424 can be trained to identify data as corresponding to a movie, a television program, or all-other-tuning. Further, the crediting model 424 may be trained to identify whether the data corresponding to all-other-tuning corresponds to an introduction, a commercial, a menu screen, etc. Currently, a moment of silence is categorized as all-other-tuning, being further categorized as a specific category of all-other-tuning. By applying the crediting model 424, the central facility 114 can determine that a panelist is not being influenced by a commercial insert during the moment of silence because they are on a menu to determine what they want to watch.

The aggregating circuitry 410 transmits the aggregated data to example report generating circuitry 426, which is structured to generate a report of the media measurement data. For example, the report generating circuitry 426 can generate a report that includes media measurement data including identified media (e.g., television programs, radio programs, movies, DVDs, etc.) presented to a panel member. In some examples, the report can be combined with other data and/or reports to generate insights and/or viewership statistics. For example, the report generated by the report generating circuitry 426 can be used by an AME to determine exposure statistics (e.g., viewership statistics) for different media based on the collected media measurement data by combining the report with data from a people meter.

In the illustrated example of FIG. 4, the media determination circuitry 222 is communicatively coupled to example training circuitry 428. The training circuitry 428 is structured to train a model (e.g., image recognition model 416 and/or other models). The training circuitry 428 includes example machine learning circuitry 430 and example model generator circuitry 432. In some examples, the machine learning circuitry 430 trains the image recognition model 416 to identify image data as a streaming provider menu and/or as media. In some examples, the image recognition model 416 may be further trained to identify the media as a commercial and/or as another type of media (e.g., a movie, a television program, etc.). In some examples, the image recognition model 416 may be trained to determine whether the image data corresponds to all-other-tuning.

While an example manner of implementing the media determination circuitry of FIG. 2 is illustrated in FIG. 4, one or more of the elements, processes, and/or devices illustrated in FIG. 4 may be combined, divided, re-arranged, omitted, eliminated, and/or implemented in any other way. Further, the example data receiving circuitry 402, example data determining circuitry 404, example audio mapping circuitry 406, example image processor circuitry 408, example aggregating circuitry 410, example image recognition circuitry 412, example audio comparison circuitry 418, example data aggregator circuitry 422, example report generating circuitry 426, example training circuitry 428, example machine learning circuitry 430, example model generator 432, and/or, more generally, the example media determination circuitry 222 of FIG. 2, may be implemented by hardware alone or by hardware in combination with software and/or firmware. Thus, for example, any of the example data receiving circuitry 402, example data determining circuitry 404, example audio mapping circuitry 406, example image processor circuitry 408, example aggregating circuitry 410, example image recognition circuitry 412, example audio comparison circuitry 418, example data aggregator circuitry 422, example report generating circuitry 426, example training circuitry 428, example machine learning circuitry 430, example model generator 432, and/or, more generally, the example media determination circuitry 222 of FIG. 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example media determination circuitry 222 of FIG. 2 may include one or more elements, processes, and/or devices in addition to, or instead of, those illustrated in FIG. 4, and/or may include more than one of any or all of the illustrated elements, processes and devices.

Figure 5A:
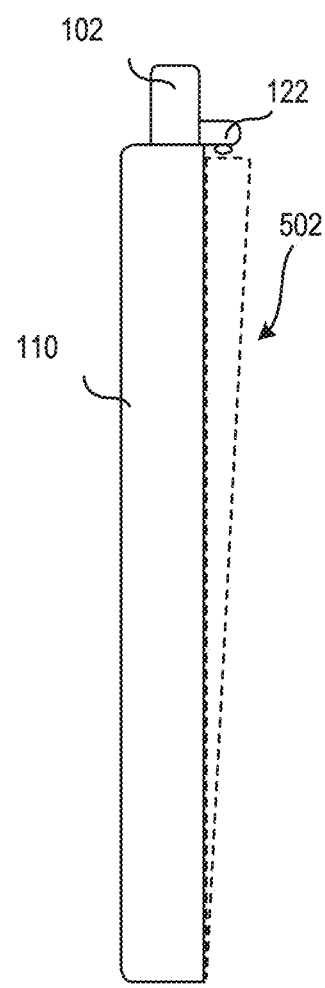
FIGS. 5A and 5B are schematic illustrations of an example image capture device that may be communicatively coupled to an example meter.
Figure 5B:
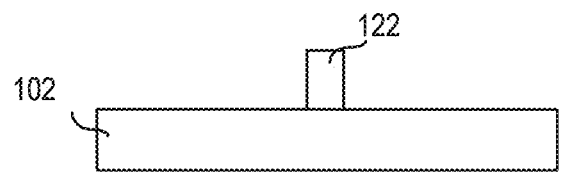

FIGS. 5A and 5B illustrates an example meter (e.g., meter 102) including an example image capture device (e.g., image capture device 122) in accordance with the teachings of this disclosure. FIG. 5A illustrates the meter 102 and image capture device 122 positioned at a top side of an example media device (e.g., media device 110). In the illustrated example of FIG. 5A, the media device 110 is a TV and the image capture device 122 is a camera. The image capture device 122 is above the media device 110, and angled downward such that the image capture device 122 can capture images of the media device 110 display screen. FIG. 5A illustrates an example field of view 502 of the image capture device 122. That is, FIG. 5A depicts the image capture device 122 positioned such that the image capture device 122 is focused on a display screen of the media device 110. Such a configuration protects a privacy of a corresponding media presentation environment because, in the illustrated example, the field of view of the image capture device 122 prevents images corresponding to a panel member, a family member of the panel member, the panel member's belongings, etc., from being captured.

FIG. 5B illustrates a schematic, top-down view of the example meter 102 and image capture device 122. The image capture device 122 is coupled both physically and communicatively to the meter 102. In some examples, the image capture device 122 may be a component of the meter 102. It is understood that the image capture device 122 and meter 102 may be positioned in any suitable location that facilitates media identification using screen capture.

Figure 6:
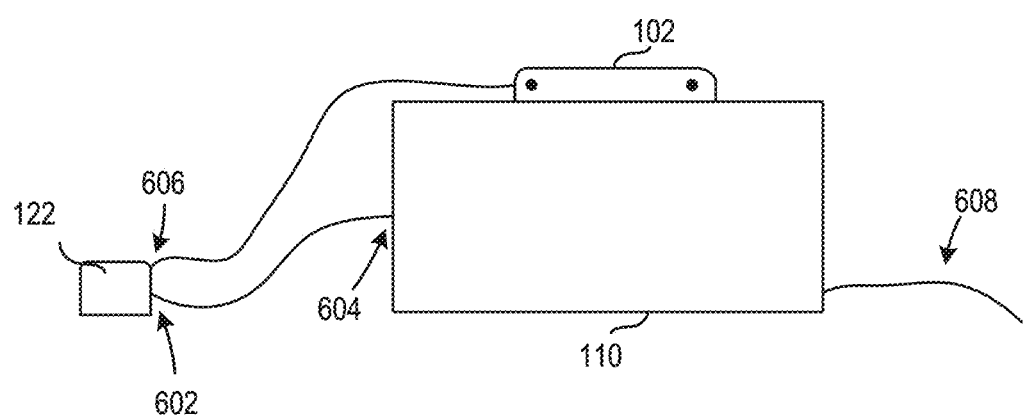
FIG. 6 is a schematic illustration of another example image capture device that may be communicatively coupled to an example meter.

FIG. 6 illustrates another example image capture device 122 in accordance with the teachings of this disclosure. In the illustrated example of FIG. 6, the example image capture device 122 is a screen capture device. An input 602 of the image capture device 122 is communicatively connected to an example video out port 604 of an example media device (e.g., media device 110). An output 606 of the image capture device 122 is communicatively coupled to an example meter (e.g., meter 102). In the illustrated example of FIG. 6, the media device 110 is a TV. However, the media device 110 may be any media device disclosed herein. The media device 110 of FIG. 6 includes an example direct coax connection 608 for streaming content. Accordingly, image data may be needed to identify media during moments of silence.

While the meter 102 of FIG. 6 is positioned on top of the media device 110, the meter 102 may be positioned elsewhere in alternative examples. Upon the meter 102 detecting a moment of silence (e.g., the media device 110 is on, but the meter 102 does not sense audio), the meter 102 instructs the image capture device 122 begin collecting screen shots of the media device 110 using the video out port 604 of the media device 110. Upon the meter 102 detecting audio, the meter 102 instructs the image capture device 122 to stop collecting screen shots. In additional or alternative examples, the meter 102 may instruct the image capture device 122 to capture screen shots based on another trigger, such as detection of a commercial, etc. In some examples, screen shots are captured to determine a provider (e.g., when audio is also available and processed to detect watermarks, but provider information cannot be determined). The screen capture device 122 transmits capture screen shots to the meter 102 for processing.

Figure 7A:
FIGS. 7A, 7B, and 7C are example images of streaming provider menus that may be captured by an image capture device and/or part of a datastore used to identify a media provider.
Figure 7B:
Figure 7C:
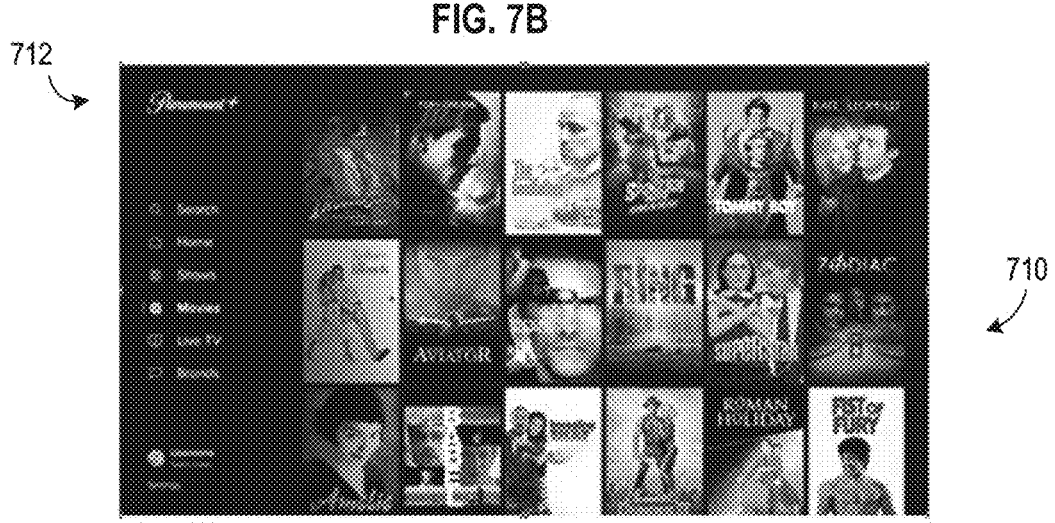

FIGS. 7A, 7B, and 7C illustrate example images of streaming provider menu screen shots that may be part of an image datastore (e.g., provider image datastore 304 of FIG. 3). FIG. 7A illustrates an image of a first streaming provider menu 702, including a first streaming provider logo 704. FIG. 7B illustrates an image of a second streaming provider 706, including a second streaming provider logo 708. FIG. 7C illustrates an image of a third streaming provider 710, including a first streaming provider logo 712. An image captured by an image capture device, such as the image capture device 122 of FIGS. 1, 2, 5, and/or 6 may be compared to the images of FIGS. 7A-7C to determine which streaming provider a panel member is using to view media.

Figure 8:
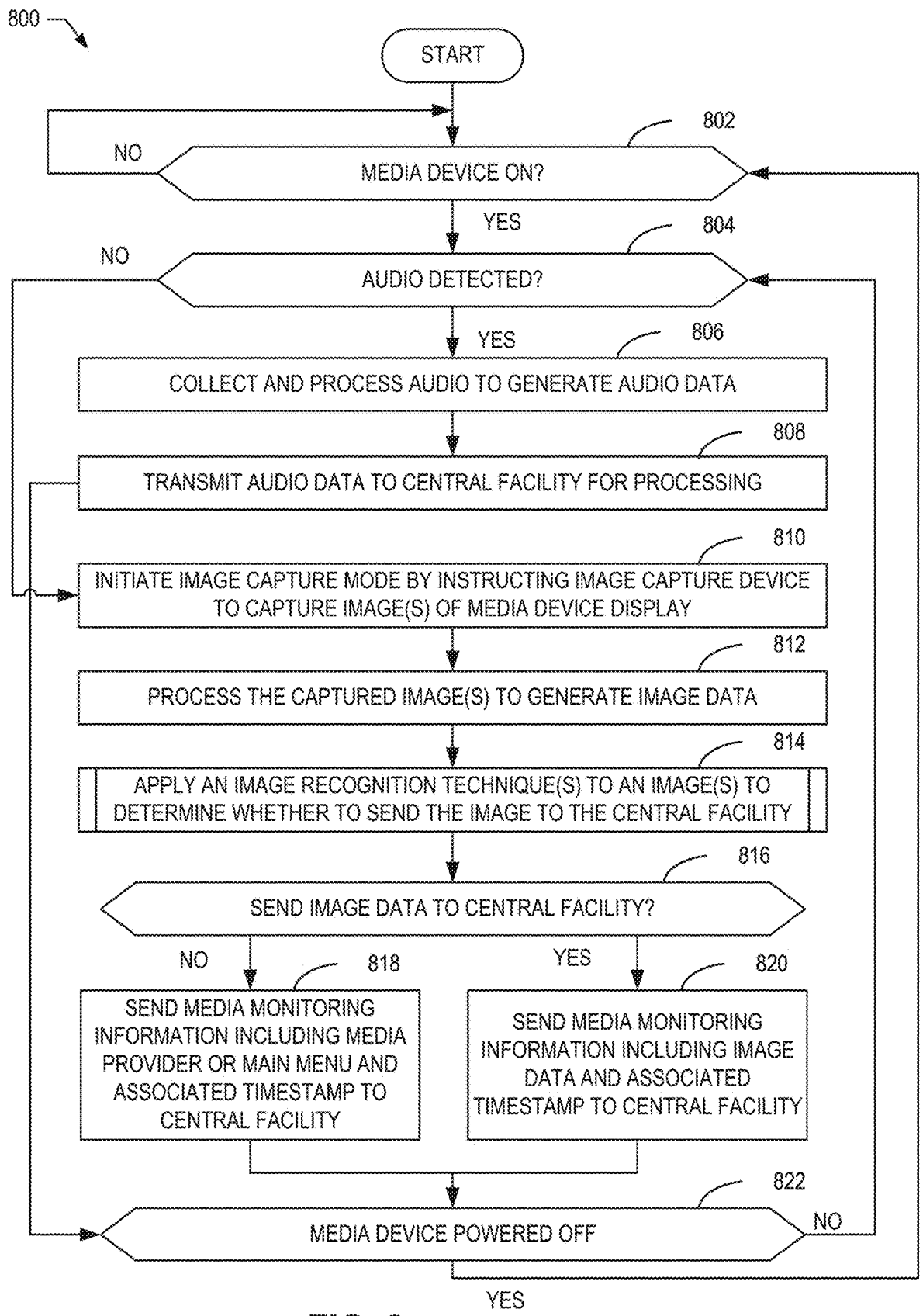
FIGS. 8-9 are flowcharts representative of example machine readable instructions and/or example operations that may be executed by example processor circuitry to implement the example provider determination circuitry of FIGS. 2 and 3.
Figure 9:
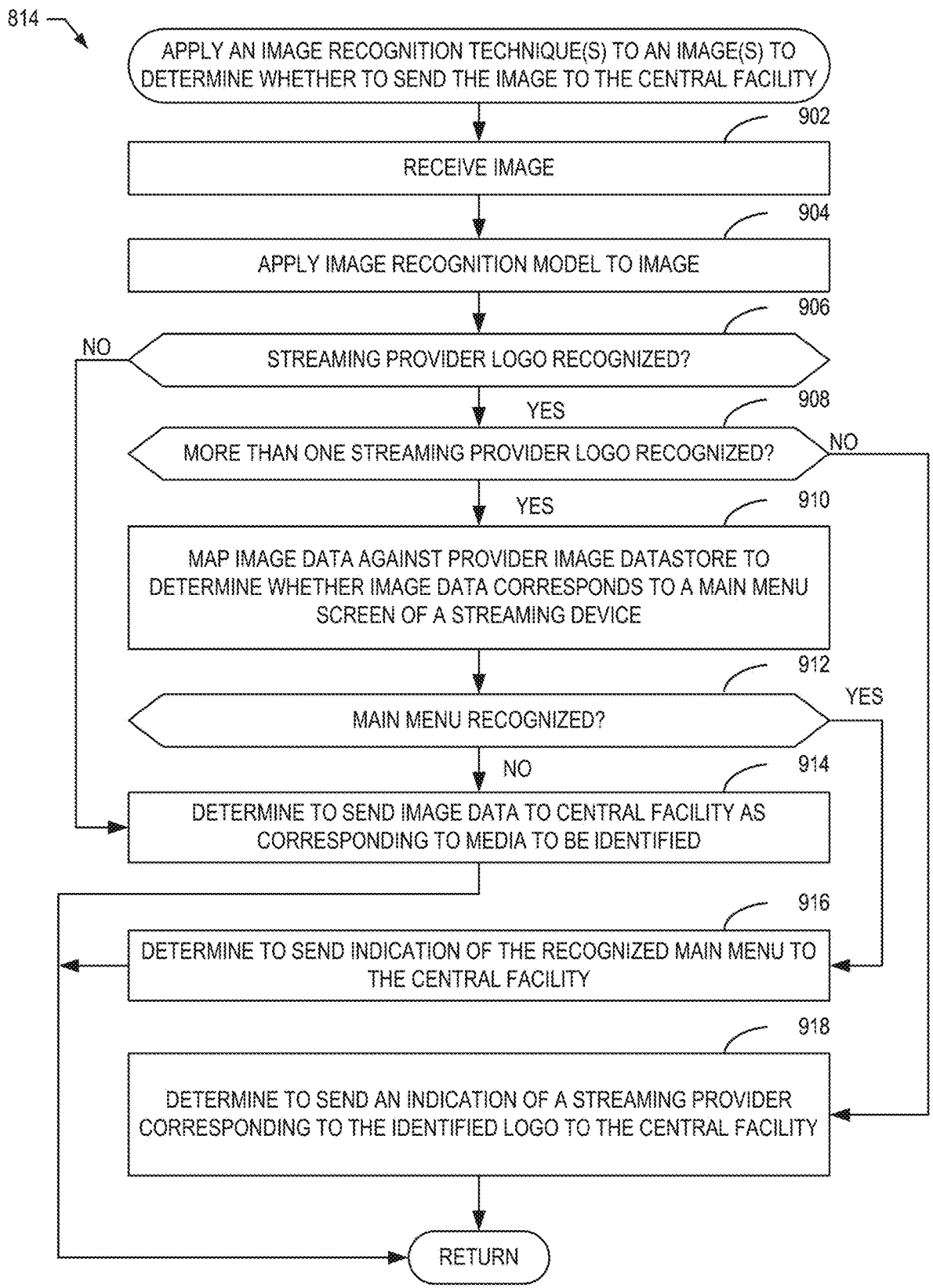
Figure 10:
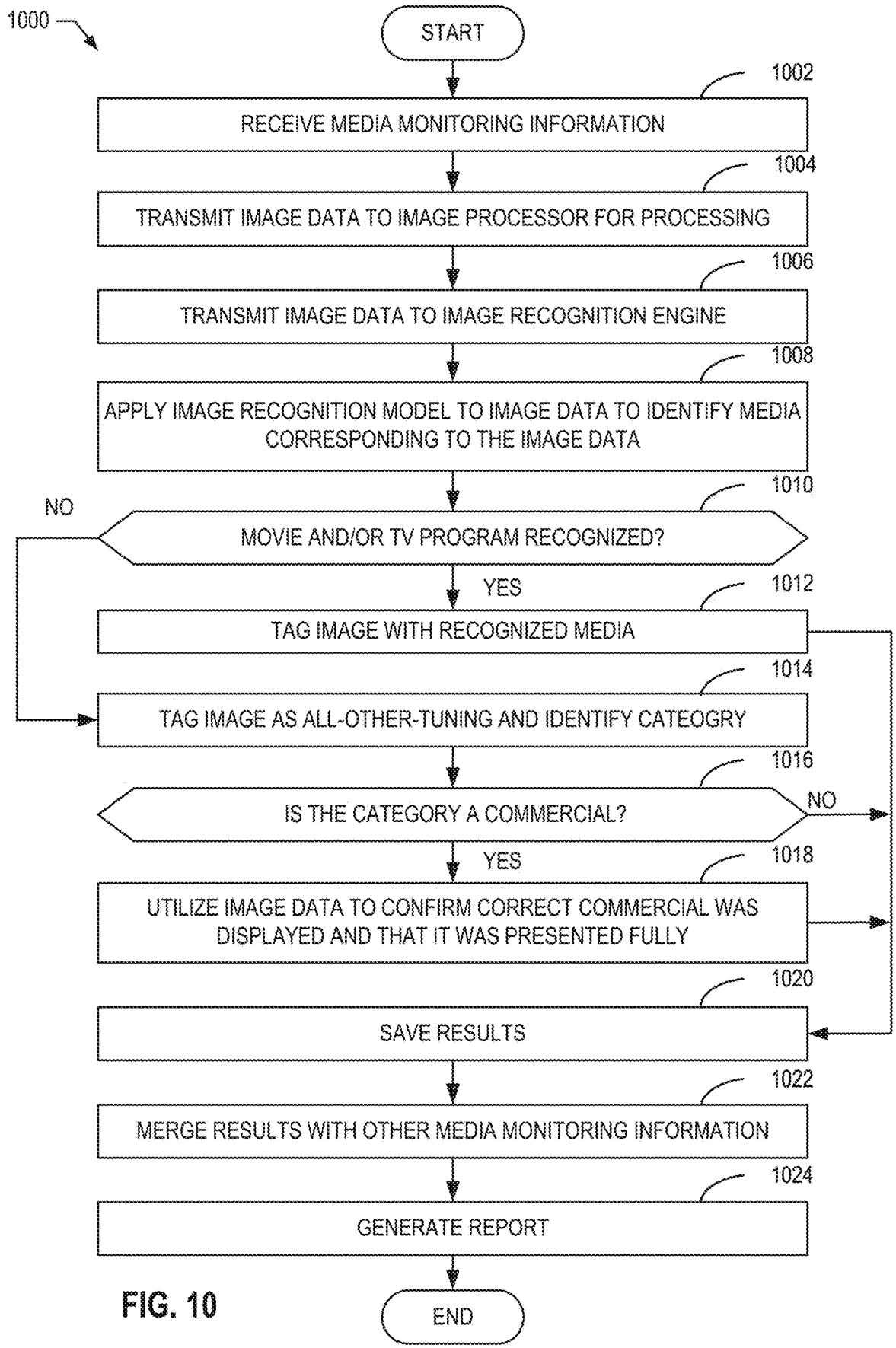
FIG. 10 is a flowchart representative of additional or alternative example machine readable instructions and/or example operations that may be executed by example processor circuitry to implement the media determination circuitry of FIGS. 2 and 4.

Flowcharts representative of example hardware logic circuitry, machine readable instructions, hardware implemented state machines, and/or any combination thereof for implementing the meter 102 of FIGS. 1, 2, 5, and 6 and/or for implementing the media determination circuitry 222 of FIGS. 2 and 4 is shown in FIGS. 8-9 and 10, respectively. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 8, 9, and/or 10, many other methods of implementing the example meter 102 and/or the media determining circuitry 222 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 8-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to identify media. The machine readable instructions and/or the operations 800 of FIG. 8 begin at block 802, at which example data capture manager circuitry (e.g., data capture manager circuitry 212) determines whether a media device (e.g., media device 110) is on. For example, the data capture manager circuitry 212 can monitor an example sensor (e.g., sensor 210) of a meter (e.g., meter 102) to determine whether a TV is powered on, indicating that a panel member may be viewing media. If the answer to block 802 is NO, control advances to the beginning at which the data capture manager circuitry 212 continues to monitor the sensor 210 to identify whether the media device 110 is on. If the answer to block 802 is YES, control advances to block 804.

At block 804, the data capture manager circuitry 212 monitors an example audio sensor (e.g., audio sensor 206) of the meter 102 to determine whether an audio signal is detected. For example the audio sensor 206 can be structured to record audio when it detects signals output by the media device 110. The data capture manager circuitry 212 can monitor the audio sensor 206 to determine whether the audio sensor 206 is recording audio. If the answer to block 804 is YES, control advances to block 806. If the answer to block 804 is NO, control advances to block 810.

At block 806, the data capture manager circuitry 212 collects and processes audio (e.g., from the audio sensor 206) to generate audio data. For example, the data capture manager circuitry 212 may input the audio into an example A/D converter 208 to transform the analog audio to digital audio data. The audio can be, for example, watermarks, signatures, etc. At block 808, the data capture manager circuitry 212 transmits the audio data to a central facility (e.g., central facility 114). Control then advances back to block 822. In additional or alterative examples, processing control proceeds from block 808 to 810. For example, control may advance from block 808 to block 810 based on another trigger (e.g., commercial identification, if images are continuously captured, etc.).

At block 810, the data capture manager circuitry 212 initiates image capture mode by instructing an example image capture device (e.g., image capture device 122) to capture an image(s) of a display of the media device 110. For example, the data capture manager circuitry 212 can instruction the image capture device 122 to begin capturing images via example image capture interface circuitry (e.g., image capture interface circuitry 216). In some examples, the data capture manager circuitry 212 initiates image capture mode to collect image data corresponding to media presented at the media device 110 to identify the media and/or a provider of the media. In some examples, control may advance from block 808 to block 810, at which audio data and image data are captured. In some such examples, media monitoring information can be used to identify whether the captured image(s) correspond to a moment of silence or whether the captured image(s) are associated with reported audio data (e.g., watermarks and/or signatures). For example, audio data and image data can be collected to ensure that all commercial content is being presented, to ensure correct content is being presented, to confirm results obtained using audio data, to facilitate auditing of a meter (e.g., by comparing the images collected by the meter to the codes/signatures that the meter is detects), etc.

At block 812, example image processor circuitry (e.g., image processor circuitry 218) processes the captured image(s) to generate image data. For example, the image capture interface circuitry 216 can receive captured images from the image capture device 122 and transmit the images to the image processor circuitry 218 for processing. In some examples, the image processor circuitry 218 process each image to correct the image if the image capture device 122 captured the image at an angle (e.g., via a camera). In some examples, the image processor circuitry 218 reduces a size of the image while maintaining pertinent image data.

At block 814, example provider determination circuitry (e.g., provider determination circuitry 220) applies an image recognition technique(s) to an image(s) to determine whether to send the image to the central facility 114. For example, the provider determination circuitry 220 may receive a processed image from the image processor circuitry 218 and apply an example image recognition model (e.g., image recognition model(s) 312) to the image. For example, the image recognition model 304 can apply image recognition algorithms to the image to determine whether the image includes an example streaming provider logo.

At block 816, based on the results obtained by the provider determination circuitry 220 at block 814, the data capture manager circuitry 212 determines whether to send the image data to the central facility 114. For example, if the provider determination circuitry 220 determines that the image corresponds to a streaming provider menu, the data capture manager circuitry 212 may determine not to send the image to the central facility 114. For example, the data capture manager circuitry 212 may determine to send an indication of the identified streaming provider rather than the image data. If the answer to block 816 is NO, control advances to block 818. If the answer to block 816 is YES, control advances to block 818.

At block 816, the data capture managers circuitry 212 determines to send media monitoring information including a streaming provider and associated timestamp to the central facility 114. For example, the data capture manager circuitry 212 may send an indication of the streaming provider to the central facility 114 instead of the image data to control an amount of data transmission to the central facility 114 from the meter 102. Control then advances to block 822.

At block 818, the data capture manager circuitry 212 determines to send media monitoring information including the image data and associated timestamp to the central facility 114. For example, if the provider determination circuitry 220 did not match the image to a streaming provider or a main menu of a streaming media device, the data capture manager circuitry 212 may determine that the image likely corresponds to media. As such, the data capture manager circuitry 212 determines to send the image data to the central facility 114 for processing and identification. Control then advances to block 822.

At block 822, the data capture manager circuitry 212 monitors the sensor 210 to determine whether the media device 110 is powered off. If the answer to block 822 is YES, control advances to block 802 at which the data capture manager circuitry 212 monitors the sensor 210 to determine whether the media device 110 is powered on. If the answer to block 820 is NO, control advances to block 804 at which the data capture manager circuitry 212 continues to monitor the audio sensor 206 of the meter 102 determines whether an audio signal is detected.

FIG. 9 is a flowchart representative of example machine readable instructions and/or example operations 814 that may be executed and/or instantiated by processor circuitry to determine whether to send an image to the central facility 114. The machine readable instructions and/or the operations 814 of FIG. 9 begin at block 902, at which the provider determination circuitry 220 receive a processed image from the image processor circuitry 218. For example, the provider determination circuitry 220 may receive a corrected image and provide the corrected image to example image recognition circuitry (e.g., image recognition circuitry 302).

At block 904, the image recognition circuitry 302 applies an example image recognition model (e.g., image recognition model 308) to the image. For example, the image recognition model 308 may be a trained CNN model that takes an image as input and outputs the image including labeled bounding boxes corresponding to a recognized image provider logo(s).

At block 906, the image recognition circuitry 302 determines whether a streaming provider is recognized. For example, the image recognition circuitry 302 determines whether the labeled bounding boxes corresponds to a streaming provider logo. If the answer to block 906 is NO, control advances to block 914 at which the provider determination circuitry 220 determines to send the image data to the central facility 114 as corresponding to media to be identified. Control then advances to block 820 of FIG. 8. If the answer to block 906 is YES, control advances to block 908.

At block 908, the image recognition circuitry 302 determines whether more than one streaming provider is recognized. For example, an image may include more than one streaming provider logo if the image corresponds to a main screen of a streaming device. If the answer to block 908 is NO, control advances to block 918 at which the provider determination circuitry 220 determines to send an indication of a streaming provider corresponding to the identified logo to the central facility 114. Control then advances to block 818 of FIG. 8. If the answer to block 908 is YES, control advances to block 910.

At block 910, example image comparison circuitry (e.g., image comparison circuitry 308) maps the image data against a provider image datastore (e.g., provider image datastore 304) to determine whether the image data corresponds to a main menu screen of a streaming device. For example, the image comparison circuitry 308 can compare the image to main menu screens in the provider image datastore 304 to determine whether the image corresponds to a main menu of a streaming device.

At block 912, the image comparison circuitry 308 determines whether a main menu is recognized. For example, the image comparison circuitry 308 may determine that the image corresponds to a main menu of a Roku® device. If the answer to block 912 is NO, (e.g., the image comparison circuitry 308 does not identify a match between the image and an image in the provider image datastore 304), control advances to block 914 at which the provider determination circuitry 220 determines to send the image to the central facility 114 as corresponding to media to be identified. If the answer to block 912 is YES (e.g., the image comparison circuitry 308 identifies the match between the image and an image in the provider image datastore 304), control advances to block 916 at which the provider determination circuitry 220 determines to send an indication of the recognized main menu to the central facility 114. Control then advances to block 818 of FIG. 8.

FIG. 10 is a flowchart representative of example machine readable instructions and/or example operations 1000 that may be executed and/or instantiated by processor circuitry to identify media. The machine readable instructions and/or the operations 1000 of FIG. 10 begin at block 1002, at which example image receiving circuitry (e.g., data receiving circuitry 402) receives image data at example media determination circuitry (e.g., media determination circuitry 222). At block 1004, the data receiving circuitry 402 inputs the image data into example image processing circuitry (e.g., image processing circuitry 404) to be processed. For example, the image data may have been captured at an angle and thus require correction. At block 1006, the image processing circuitry 404 inputs the processed image data into example image recognition circuitry (e.g., image recognition circuitry 412). At block 1008, the image recognition circuitry 412 maps the image data against an example media image datastore (e.g., image datastore 416) to identify media corresponding to the image data.

At block 1010, the image recognition circuitry 412 determines whether a movie and/or TV program is recognized in the image data. If the answer to block 1010 is YES, the image recognition circuitry 412 tags the image data with the recognized media (block 1012). If the answer to block 1010 is NO, the image recognition circuitry 412 tags the image as corresponding to all-other-tuning and identifies a respective all-other-tuning category (block 1014). Further, the media determination circuitry 222 saves the generated results (block 1024).

At block 1016, the image recognition circuitry 412 determines whether the all-other-tuning category is a commercial. If the answer to block 1016 is YES, the central facility 114 utilizes the image data to confirm that a correct commercial was displayed and that it was fully presented (block 1018). Further, the media determination circuitry 222 saves the generated results (block 1024). If the answer to block 1016 is NO, the image recognition circuitry 412 determines whether the all-other-tuning category is a menu corresponding to a streaming provider (block 1020). If the answer to block 1020 is YES, the image recognition circuitry 412 tags the image data with an indication of the streaming provider menu (block 1022). If the answer to block 1020 is NO, the media determination circuitry 222 saves the generated results (block 1024).

Figure 11:
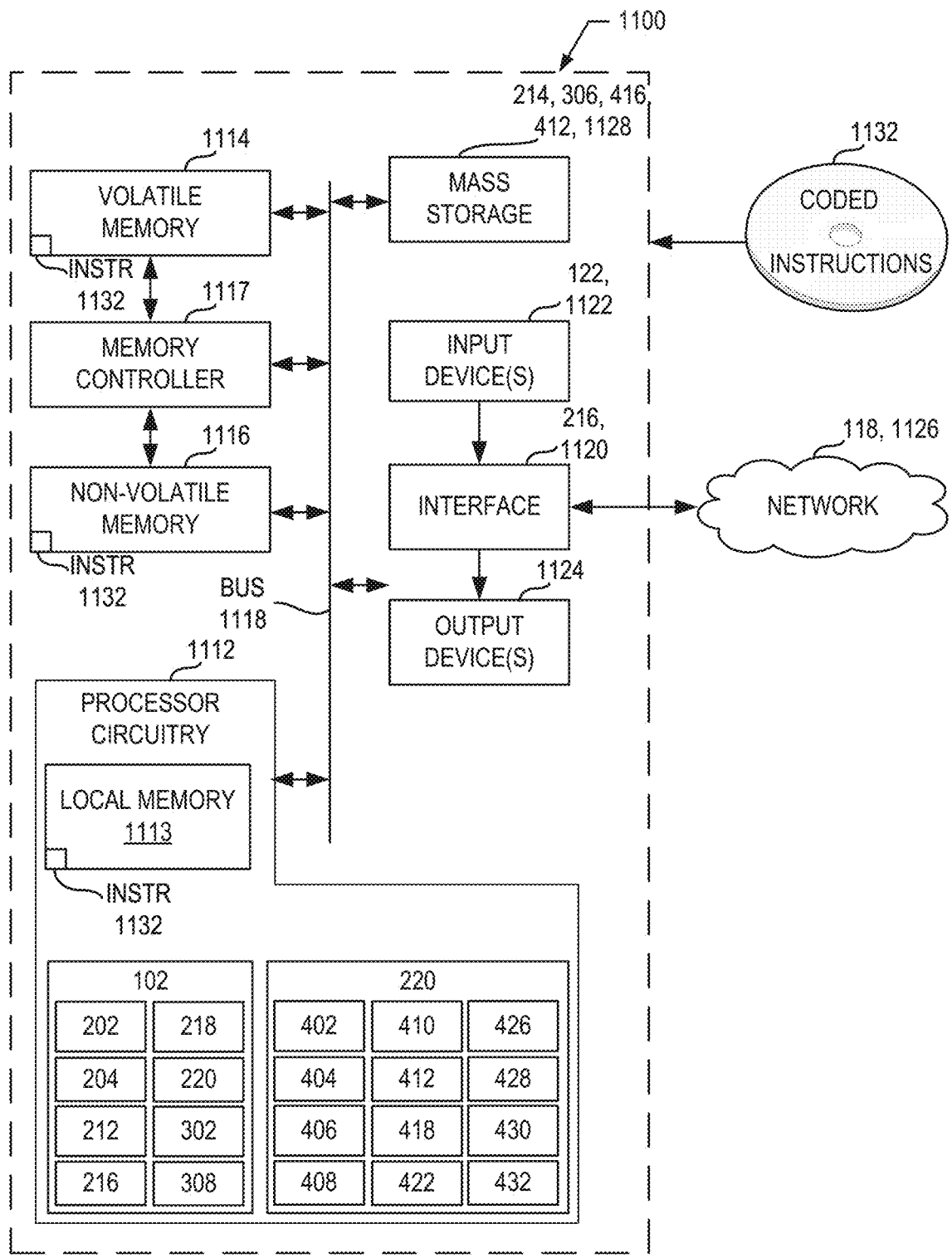
FIG. 11 is a block diagram of an example processing platform including processor circuitry structured to execute the example machine readable instructions and/or the example operations of FIGS. 8-9 to implement the meter of FIGS. 2 and 3 and/or FIG. 10 to implement the media determination circuitry of FIGS. 2 and/or 4.

FIG. 11 is a block diagram of an example processor platform 1100 structured to execute and/or instantiate the machine readable instructions and/or the operations of FIGS. 8-9 and/or FIG. 10 to implement the meter 102 of FIGS. 1, 2, 5, and/or 6 and/or to implement the media determination circuitry 222 of FIGS. 2 and 4. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements example processor circuitry 202, example network interface circuitry 204, example data capture manager circuitry 212, example image capture interface circuitry 216, example image processor circuitry 218, example provider determination circuitry 220, example image recognition circuitry 302, and example image comparison circuitry 308 and/or example media determination circuitry 222, including example data receiving circuitry 402, example data determining circuitry 404, example audio mapping circuitry 406, example image processor circuitry 408, example aggregating circuitry 410, example image recognition circuitry 412, example audio comparison circuitry 418, example data aggregator circuitry 422, example report generating circuitry 426, example training circuitry, example machine learning circuitry 430, and example model generator 432.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIGS. 8-9 and/or 10, may be stored in the mass storage device 1128, in the volatile memory 1114, in the non-volatile memory 1116, and/or on a removable non-transitory computer readable storage medium such as a CD or DVD.

Figure 12:
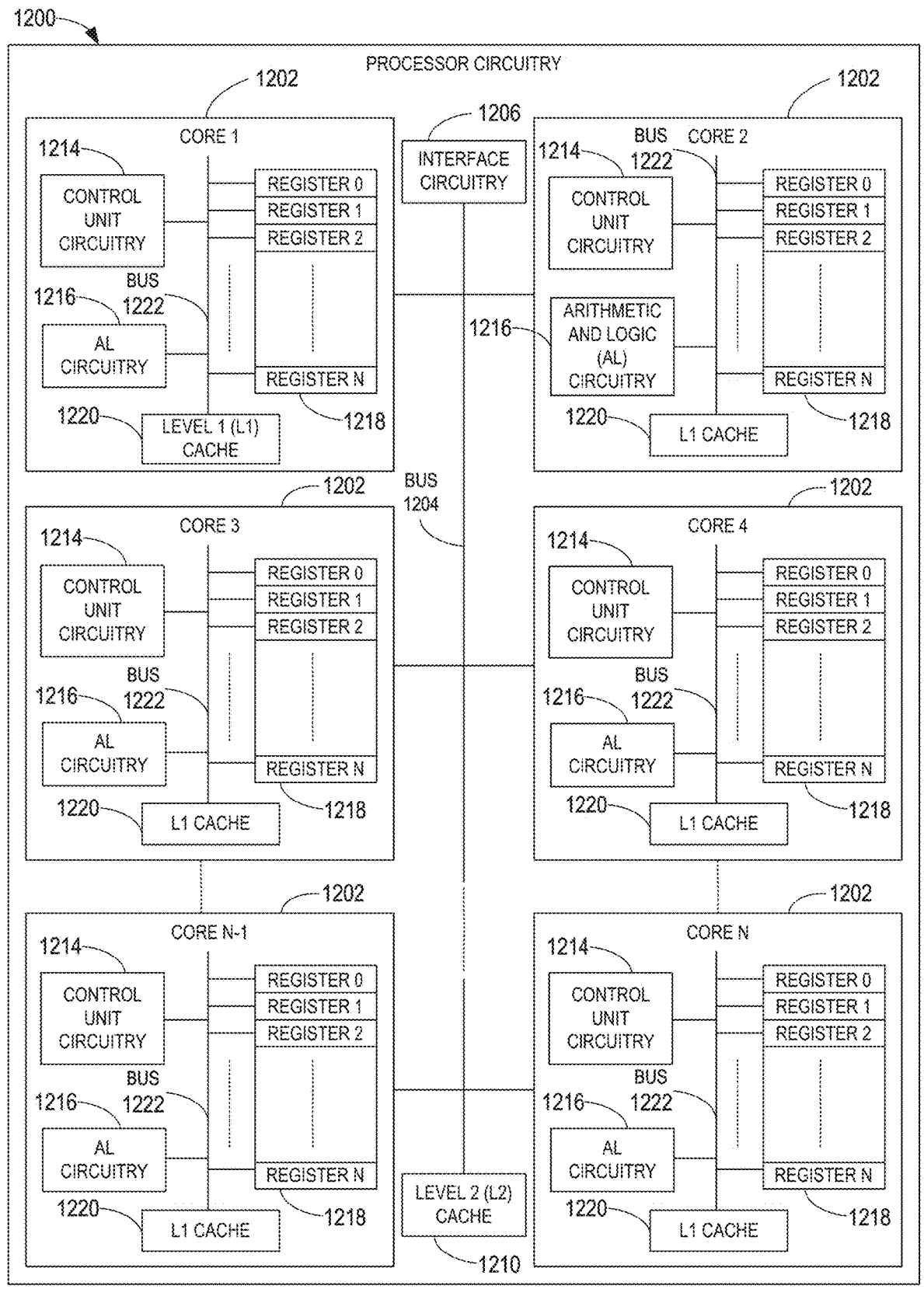
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a general purpose microprocessor 1200. The general purpose microprocessor circuitry 1200 executes some or all of the machine readable instructions of the flowcharts of FIGS. 8-9 to effectively instantiate the meter 102 of FIG. 2 as logic circuits to perform the operations corresponding to those machine readable instructions. In some such examples, the circuitry of FIGS. 2 and/or 4 is instantiated by the hardware circuits of the microprocessor 1200 in combination with the instructions. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 8-9 and/or 10.

The cores 1202 may communicate by a first example bus 1204. In some examples, the first bus 1204 may implement a communication bus to effectuate communication associated with one(s) of the cores 1202. For example, the first bus 1204 may implement at least one of an Inter-Integrated Circuit (I2C) bus, a Serial Peripheral Interface (SPI) bus, a PCI bus, or a PCIe bus. Additionally or alternatively, the first bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_ cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
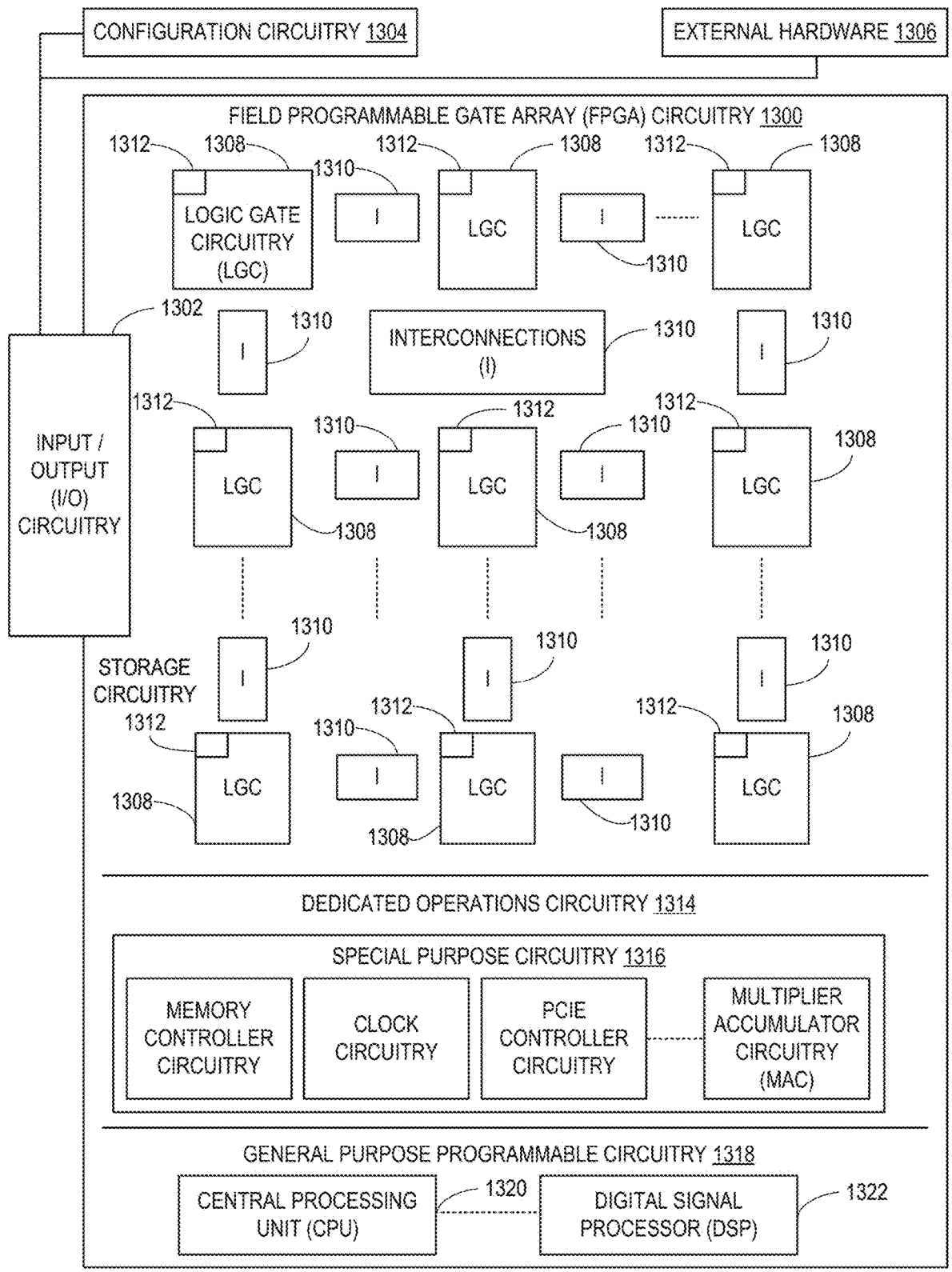
FIG. 13 is a block diagram of another example implementation of the processor circuitry of FIG. 11.
Figure 14:
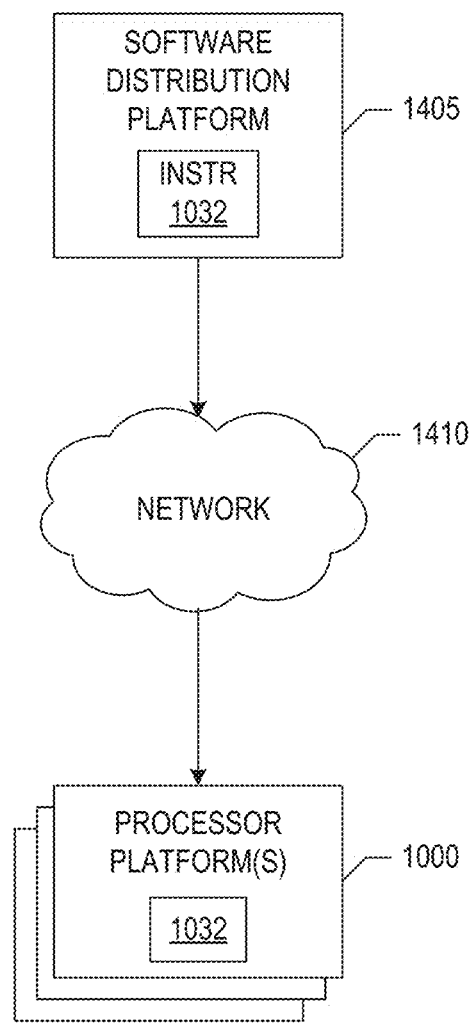
FIG. 14 is a block diagram of an example software distribution platform (e.g., one or more servers) to distribute software (e.g., software corresponding to the example machine readable instructions of FIGS. 8-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 8-9 and/or 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 8-9 and/or 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 8-9 and/or 10. As such, the FPGA circuitry 1300 may be structured to effectively instantiate some or all of the machine readable instructions of the flowcharts of FIGS. 8-9 and/or 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 8-9 and/or 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. 11 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 8-9 and/or 10 may be executed by one or more of the cores 1202 of FIG. 12, a second portion of the machine readable instructions represented by the flowcharts of FIGS. 8-9 and/or 10 may be executed by the FPGA circuitry 1300 of FIG. 13, and/or a third portion of the machine readable instructions represented by the flowcharts of FIGS. 8-9 and/or 10 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

A block diagram illustrating an example software distribution platform 1405 to distribute software such as the example machine readable instructions 1132 of FIG. 11 to hardware devices owned and/or operated by third parties is illustrated in FIGS. 8-9 and/or 10. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 800, 814 of FIGS. 8-9 and/or example machine readable instructions 1000 of FIG. 10, as described above. The one or more servers of the example software distribution platform 1405 are in communication with a network 1410, which may correspond to any one or more of the Internet and/or any of the example networks 118, 1126 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 800, 814 of FIGS. 8-9 and/or example machine readable instructions 1000 of FIG. 10, may be downloaded to the example processor platform 1100, which is to execute the machine readable instructions 1132 to implement the meter 102 and/or the media determining circuitry 222. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that utilize image capture to identify media. Disclosed systems, methods, apparatus, and articles of manufacture improve the efficiency of using a computing device by capturing images of a media device while the media device is powered on but not emitting audio that a meter can sense. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to identify media using screen capture are disclosed herein. Further examples and combinations thereof include the following:

Example 1 includes a meter device comprising at least one memory, computer-readable instructions, and processor circuitry to execute the computer-readable instruction to at least, in response to determining a media device is powered on, monitor a media device to detect audio output by the media device; in response to audio not being detected for a period of time, instruct an image capture device to capture image data representative of a media presentation by the media device; instruct the image capture device to stop capturing the image data in response to detection of audio output by the media device; and determine, based on whether the image data corresponds to a menu presentation by the media device, whether to transmit the image data to a central facility for media identification.

Example 2 includes the meter device of example 1, wherein the screen capture device includes a camera in communication with the meter device, the camera oriented to capture the image data representative of the media presentation by the media device without capturing image data of an environment surrounding the media device.

Example 3 includes the meter device of example 2, wherein the camera is attachable to a top side of the media device, the camera to be angled towards the media device, and the processor circuitry is to process the image data captured by the image capture device to account for the angle.

Example 4 includes the meter device of any preceding example, wherein the processor circuitry is to instruct image capture device to capture the image data at a rate of substantially one frame per two seconds until the image capture device is instructed to stop the capturing of the image data.

Example 5 includes the meter device of any preceding example, wherein the processor circuitry is to determine whether the image data corresponds to a menu presentation; if the image data corresponds to the menu presentation, transmit an indication of the menu presentation and a timestamp associated with the image data to the central facility; and if the image data does not correspond to the menu presentation, transmit the image data and the associated timestamp to the central facility for identification.

Example 6 includes the meter device of any preceding example, wherein the menu presentation corresponds to one of a streaming provider menu or a main menu of the media device, and the processor circuitry is to determine that the image data corresponds to the streaming provider menu if the image includes one streaming provider logo, the streaming provider menu corresponding to the streaming provider logo; determine that the image data corresponds to the main menu of the media device if the image includes more than one streaming provider logo; and in response to a determination that the image data corresponds to the main menu of the media device, identify the media device by searching the image data against a database of images of main menus corresponding to media devices.

Example 7 includes the meter device of any preceding example, wherein the processor circuitry is to instruct the image capture device to start the capturing of the image data in response to a determination that the media presentation corresponds to a commercial.

Example 8 includes the meter device of any preceding example, wherein the processor circuitry is to tag the captured image data as associated with a moment of silence prior to transmission of the captured image data to the central facility.

Example 9 includes at least one non-transitory computer readable storage medium comprising instructions that, when executed, cause a machine to at least, in response to determining a media device is powered on, monitor the media device to detect audio output by the media device; in response to audio not being detected for a period of time, instruct an image capture device to capture image data representative of a media presentation by the media device; instruct the image capture device to stop capturing the image data in response to detection of audio output by the media device; and determine, based on whether the image data corresponds to a menu presentation by the media device, whether to transmit the image data to a central facility for media identification.

Example 10 includes the at least one non-transitory computer readable storage medium of example 9, wherein the image capture device includes a camera, the camera oriented to capture the image data representative of the media presentation by the media device without capturing image data of an environment surrounding the media device.

Example 11 includes the at least one non-transitory computer readable storage medium of example 10, wherein the camera is attachable to a top side of the media device, the camera to be angled towards the media device, and the machine is to process the image data captured by the image capture device to account for the angle.

Example 12 includes the at least one non-transitory computer readable storage medium of any preceding example, wherein the machine is to instruct image capture device to capture the image data at a rate of substantially one frame per two seconds until the image capture device is instructed to stop the capturing of the image data.

Example 13 includes the at least one non-transitory computer readable storage medium of any preceding example, wherein the machine is to determine whether the image data corresponds to a menu presentation; if the image data corresponds to the menu presentation, transmit an indication of the menu presentation and a timestamp associated with the image data to the central facility; and if the image data does not correspond to the menu presentation, transmit the image data and the associated timestamp to the central facility for identification.

Example 14 includes the at least one non-transitory computer readable storage medium of any preceding example, wherein the menu presentation corresponds to one of a streaming provider menu or a main menu of the media device, and the machine is to determine that the image data corresponds to the streaming provider menu if the image includes one streaming provider logo, the streaming provider menu corresponding to the streaming provider logo; determine that the image data corresponds to the main menu of the media device if the image includes more than one streaming provider logo; and in response to a determination that the image data corresponds to the main menu of the media device, identify the media device by searching the image data against a database of images of main menus corresponding to media devices.

Example 15 includes the at least one non-transitory computer readable storage medium of any preceding example, wherein the machine is to instruct the image capture device to start the capturing of the image data in response to a determination that the media presentation corresponds to a commercial.

Example 16 includes the at least one non-transitory computer readable storage medium of any preceding example, wherein the machine is to tag the captured image data as associated with a moment of silence prior to transmission of the captured image data to the central facility.

Example 17 includes a method comprising monitoring, by executing machine-readable instructions by at least one processor, a media device to detect audio output by the media device in response to determining the media device is powered on; instructing, by executing machine-readable instructions by the at least one processor, an image capture device to capture image data representative of a media presentation by the media device when audio is not detected for a period of time; instructing, by executing machine-readable instructions by the at least one processor, the image capture device to stop capturing the image data in response to detection of audio output by the media device; and determining, by executing machine-readable instructions by the at least one process, based on whether the image data corresponds to a menu presentation by the media device, whether to transmit the image data to a central facility for media identification.

Example 18 includes the method of example 17, wherein the screen capture device includes a camera, the camera oriented to capture the image data representative of the media presentation by the media device without capturing image data of an environment surrounding the media device.

Example 19 includes the method of any example 18, wherein the camera is attachable to a top side of the media device, the camera to be angled towards the media device, and the method further including processing the image data captured by the image capture device to account for the angle.

Example 20 includes the method of any preceding example, further including instructing the image capture device to capture the image data at a rate of substantially one frame per two seconds until the image capture device is instructed to stop the capturing of the image data.

Example 21 includes the method of any preceding example, further including determining whether the image data corresponds to a menu presentation; if the image data corresponds to the menu presentation, transmitting an indication of the menu presentation and a timestamp associated with the image data to the central facility; and if the image data does not correspond to the menu presentation, transmitting the image data and the associated timestamp to the central facility for identification.

Example 22 includes the method of any preceding example, wherein the menu presentation corresponds to one of a streaming provider menu or a main menu of the media device, the method further including determining that the image data corresponds to the streaming provider menu if the image includes one streaming provider logo, the streaming provider menu corresponding to the streaming provider logo; determining that the image data corresponds to the main menu of the media device if the image includes more than one streaming provider logo; and in response to a determination that the image data corresponds to the main menu of the media device, identifying the media device by searching the image data against a database of images of main menus corresponding to media devices.

Example 23 includes the method of any preceding example, further including instructing the image capture device to start the capturing of the image data in response to a determination that the media presentation corresponds to a commercial.

Example 24 includes the method of any preceding example, further including tagging the captured image data as associated with a moment of silence prior to transmission of the captured image data to the central facility.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A meter device comprising:
    an audio sensor;
    at least one memory storing computer-readable instructions; and;
    a processor to execute the computer-readable instructions to at least:
        in response to determining a media device is powered on, monitor a media device to detect audio output at the audio sensor by the media device, wherein detecting the audio output at the audio sensor comprises:
            detecting, at the audio sensor, audio signals from the media device; and
            causing the audio sensor to record the audio signals;
        in response to audio not being detected for a period of time, instruct an image capture device to capture image data representative of a media presentation by the media device;
        instruct the image capture device to stop capturing the image data in response to detection of audio output by the media device; and
        determine, based on whether the image data corresponds to a menu presentation by the media device, whether to transmit the image data from the meter device to a central facility for media identification.

2. The meter device of claim 1, wherein the screen capture device includes a camera in communication with the meter device, the camera oriented to capture the image data representative of the media presentation by the media device without capturing image data of an environment surrounding the media device.

3. The meter device of claim 2, wherein the camera is attachable to a top side of the media device, the camera to be angled towards the media device, and the processor is to process the image data captured by the image capture device to account for the angle.

4. The meter device of claim 1, wherein the processor is to instruct image capture device to capture the image data at a rate of substantially one frame per two seconds until the image capture device is instructed to stop the capturing of the image data.

5. The meter device of claim 1, wherein the processor is to:
  determine whether the image data corresponds to a menu presentation;
  if the image data corresponds to the menu presentation, transmit an indication of the menu presentation and a timestamp associated with the image data to the central facility; and
  if the image data does not correspond to the menu presentation, transmit the image data and the associated timestamp to the central facility for identification.

6. The meter device of claim 5, wherein the menu presentation corresponds to one of a streaming provider menu or a main menu of the media device, and the processor is to:
  determine that the image data corresponds to the streaming provider menu if the image includes one streaming provider logo, the streaming provider menu corresponding to the streaming provider logo;
  determine that the image data corresponds to the main menu of the media device if the image includes more than one streaming provider logo; and
  in response to a determination that the image data corresponds to the main menu of the media device, identify the media device by searching the image data against a database of images of main menus corresponding to media devices.

7. The meter device of claim 1, wherein the processor is to instruct the image capture device to start the capturing of the image data in response to a determination that the media presentation corresponds to a commercial.

8. The meter device of claim 1, wherein the processor is to tag the captured image data as associated with a moment of silence prior to transmission of the captured image data to the central facility.

9. At least one non-transitory computer readable storage medium comprising instructions that, when executed, cause a machine to at least:
  in response to determining a media device is powered on, monitor the media device to detect audio output at an audio sensor by the media device, wherein detecting the audio output at the audio sensor comprises:
    detecting, at the audio sensor, audio signals from the media device; and
    causing the audio sensor to record the audio signals;
  in response to audio not being detected for a period of time, instruct an image capture device to capture image data representative of a media presentation by the media device;
  instruct the image capture device to stop capturing the image data in response to detection of audio output by the media device; and
  determine, based on whether the image data corresponds to a menu presentation by the media device, whether to transmit the image data from the meter device to a central facility for media identification.

10. The at least one non-transitory computer readable storage medium of claim 9, wherein the image capture device includes a camera, the camera oriented to capture the image data representative of the media presentation by the media device without capturing image data of an environment surrounding the media device.

11. The at least one non-transitory computer readable storage medium of claim 10, wherein the camera is attachable to a top side of the media device, the camera to be angled towards the media device, and the instructions are to cause the machine to process the image data captured by the image capture device to account for the angle.

12. The at least one non-transitory computer readable storage medium of claim 9, wherein the instructions are to cause the machine to instruct image capture device to capture the image data at a rate of substantially one frame per two seconds until the image capture device is instructed to stop the capturing of the image data.

13. The at least one non-transitory computer readable storage medium of claim 9, wherein the instructions are to cause the machine to:
  determine whether the image data corresponds to a menu presentation;
  if the image data corresponds to the menu presentation, transmit an indication of the menu presentation and a timestamp associated with the image data to the central facility; and
  if the image data does not correspond to the menu presentation, transmit the image data and the associated timestamp to the central facility for identification.

14. The at least one non-transitory computer readable storage medium of claim 13, wherein the menu presentation corresponds to one of a streaming provider menu or a main menu of the media device, and the instructions are to cause the machine to:
  determine that the image data corresponds to the streaming provider menu if the image includes one streaming provider logo, the streaming provider menu corresponding to the streaming provider logo;
  determine that the image data corresponds to the main menu of the media device if the image includes more than one streaming provider logo; and
  in response to a determination that the image data corresponds to the main menu of the media device, identify the media device by searching the image data against a database of images of main menus corresponding to media devices.

15. A method comprising:
  monitoring, by executing a machine-readable instruction with at least one processor of a meter device, a media device to detect audio output by the media device in response to determining the media device is powered on, wherein detecting the audio output by the media device comprises:
    detecting audio signals from the media device; and
    causing an audio sensor to record the audio signals;
  instructing, by executing a machine-readable instruction with the at least one processor of the meter device, an image capture device to capture image data representative of a media presentation by the media device when audio is not detected for a period of time;
  instructing, by executing a machine-readable instruction with the at least one processor of the meter device, the image capture device to stop capturing the image data in response to detection of audio output by the media device; and determining, by executing a machine-readable instruction with the at least one processor of the meter device, and based on whether the image data corresponds to a menu presentation by the media device, whether to transmit the image data from the meter device to a central facility for media identification.

16. The method of claim 15, wherein the screen capture device includes a camera, the camera oriented to capture the image data representative of the media presentation by the media device without capturing image data of an environment surrounding the media device.

17. The method of claim 16, wherein the camera is attachable to a top side of the media device, the camera to be angled towards the media device, and further including processing the image data captured by the image capture device to account for the angle.

18. The method of claim 15, further including instructing the image capture device to capture the image data at a rate of substantially one frame per two seconds until the image capture device is instructed to stop the capturing of the image data.

19. The method of claim 15, further including:
determining whether the image data corresponds to a menu presentation;
if the image data corresponds to the menu presentation, transmitting an indication of the menu presentation and a timestamp associated with the image data to the central facility; and
if the image data does not correspond to the menu presentation, transmitting the image data and the associated timestamp to the central facility for identification.

20. The method of claim 15, wherein the menu presentation corresponds to one of a streaming provider menu or a main menu of the media device, and further including:
determining that the image data corresponds to the streaming provider menu if the image includes one streaming provider logo, the streaming provider menu corresponding to the streaming provider logo;
determining that the image data corresponds to the main menu of the media device if the image includes more than one streaming provider logo; and
in response to determining that the image data corresponds to the main menu of the media device, identifying the media device by searching the image data against a database of images of main menus corresponding to media devices.

* * * * *